United States Patent
Kim et al.

(10) Patent No.: US 7,611,248 B2
(45) Date of Patent: Nov. 3, 2009

(54) PROJECTION LENS UNIT AND THIN PROJECTOR USING THE SAME

(75) Inventors: Nam Sik Kim, Gyeonggi-do (KR); Seung Gyu Lee, Gyeonggi-do (KR); Han Kyoung Cho, Daegu (KR); Ki So Bok, Seoul (KR); Jun Ho Lee, Gyeonggi-do (KR); Soon Hyung Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 11/311,335

(22) Filed: Dec. 20, 2005

(65) Prior Publication Data
US 2006/0132727 A1    Jun. 22, 2006

(30) Foreign Application Priority Data

Dec. 21, 2004   (KR)  ................. 10-2004-0109323
Dec. 22, 2004   (KR)  ................. 10-2004-0110193
May 27, 2005    (KR)  ................. 10-2005-0045000

(51) Int. Cl.
| | |
|---|---|
| G03B 21/14 | (2006.01) |
| G03B 21/22 | (2006.01) |
| G03B 3/00  | (2006.01) |
| G03B 21/28 | (2006.01) |
| G03B 21/16 | (2006.01) |
| G02F 1/00  | (2006.01) |
| H04N 5/64  | (2006.01) |
| H04N 3/14  | (2006.01) |

(52) U.S. Cl. .................. 353/101; 353/119; 353/98; 353/81; 353/84; 353/61; 348/771; 348/751; 348/766; 348/789; 348/790

(58) Field of Classification Search ................ 353/119, 353/101, 98, 96, 81, 20, 84, 61; 348/771, 348/751, 766, 789, 790; 362/561
See application file for complete search history.

(56) References Cited

U.S. PATENT DOCUMENTS

| | | | |
|---|---|---|---|
| 5,442,484 A | 8/1995 | Shikawa | |
| 5,604,560 A * | 2/1997 | Kaneda | .............. 396/133 |

(Continued)

FOREIGN PATENT DOCUMENTS

CN    1418431 A    5/2003

(Continued)

OTHER PUBLICATIONS

Liansheng; "4 1 Application in Optical Device of Plane Mirror Prism Lens System"; Publishing House of Beijing Institute of Technology; Feb. 2000; pp. 66-67.

*Primary Examiner*—Diane I Lee
*Assistant Examiner*—Magda Cruz
(74) *Attorney, Agent, or Firm*—Birch, Stewart, Kolasch & Birch, LLP

(57) ABSTRACT

A projection lens unit and a thin projector using the same are disclosed. The projection lens unit includes a plurality of lens sets for emitting light carrying an image, and a reflector arranged between adjacent ones of the lens sets or at a downstream end of the lens sets, and adapted to change a direction of light incident on the reflector.

19 Claims, 23 Drawing Sheets

U.S. PATENT DOCUMENTS

| | | |
|---|---|---|
| 5,712,733 A | 1/1998 | Mukaiya |
| 6,008,951 A * | 12/1999 | Anderson .................. 359/677 |
| 6,113,240 A | 9/2000 | Iizuka |
| 6,144,503 A | 11/2000 | Sugano |
| 6,783,249 B2 | 8/2004 | Yoneyama |
| 6,981,770 B2 * | 1/2006 | Murai et al. .................. 353/61 |
| 7,390,098 B2 * | 6/2008 | Wada ........................ 353/101 |
| 2003/0128304 A1 | 7/2003 | Park et al. |
| 2004/0027684 A1 * | 2/2004 | Nishioka et al. ............ 359/676 |
| 2004/0233396 A1 | 11/2004 | Shimizu |
| 2004/0257666 A1 | 12/2004 | Komatsu et al. |
| 2005/0264764 A1 * | 12/2005 | Lee ............................ 353/33 |

FOREIGN PATENT DOCUMENTS

| | | |
|---|---|---|
| JP | 06-202064 | 7/1994 |
| JP | 2003248271 | 9/2003 |
| JP | 2004184768 A * | 7/2004 |
| KR | 2000-0015666 U | 8/2000 |
| KR | 200282958 | 11/2002 |
| KR | 200422976 | 3/2004 |
| KR | 10-2004-0072424 A | 8/2004 |
| WO | WO-96/27142 A1 | 9/1996 |
| WO | WO-2004/090599 A1 | 10/2004 |

* cited by examiner

Air outlet

Function button

Input/Output terminal

Air inlet

PROJECTION LENS UNIT AND THIN PROJECTOR USING THE SAME

This application claims the benefit of Korean Patent Application No. 10-2004-0110193, filed on Dec. 22, 2004, Korean Patent Application No. 10-2004-0109323, filed on Dec. 21, 2004 and Korean Patent Application No. 10-2005-0045000, filed on May 27, 2005, which are hereby incorporated by reference as if fully set forth herein.

BACKGROUND OF THE INVENTION

1. Field of the Invention

The present invention relates to a projector, and more particularly, to a projection lens unit and a thin projector using the same.

2. Discussion of the Related Art

The recent tendency of display devices is to provide a large screen size as well as lightness and thinness.

Of such display devices, projectors have been greatly highlighted because they can realize a large screen of 100 inches or more.

Such a projector is a display device which projects an image produced by a micro device such as a liquid crystal display (LCD) panel, a liquid crystal on silicon (LCOS) panel, or a digital micromirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a two-panel type projector, white light is separated into color light components in a space-division and time-division manner, and the color light components are illuminated to two micro devices. In a three-panel type projector, white light is separated into color light components in a space-division manner, and the color light components are illuminated to three micro devices.

FIG. 1 is a schematic view illustrating an arrangement of a general single panel type projector. FIG. 2 is a perspective view illustrating an appearance of the projector shown in FIG. 1.

As shown in FIG. 1, the single panel type projector includes a light source 2, a color wheel 3, a light tunnel 4, illumination lenses 5 and 6, a micro device 7, a prism 8, and a projection lens unit 1.

In the illustrated single panel type projector, light emitted from the light source 2 is separated into red, green, and blue light beams. The separated light beams are modulated to have uniform brightness while passing through the light tunnel 4. The light beams are then incident on the micro device 7 after passing through the illumination lenses 5 and 6 and the prism 8.

The incident light carries an image signal while passing through the micro device 7, and is then projected onto a screen via the prism 8 and projection lens unit 1.

In the conventional projector having the above-mentioned arrangement, the projection lens unit 1 and micro device 7, which serve to externally emit light in an enlarged state, are arranged in parallel, whereas the lenses 4, 5, and 6 and color drum 3, which transfer light from the light source 2, are arranged perpendicularly to the projection lens unit 1.

As shown in FIG. 2, the projection lens unit 1 includes a plurality of lenses which are arranged in parallel such that the direction of light emitted from the projection lens unit 1 is identical to the direction of light incident on the projection lens unit 1.

Due to such an arrangement of the projection lens unit 1, the optical elements in the optical system of the conventional projector are arranged in a U shape. As a result, the conventional projector has an increased thickness.

That is, the conventional projector generally has a rectangular hexahedral appearance such that the top/bottom side thereof has an area larger than that of the front side thereof where the projection lens unit is arranged, as shown in FIG. 3.

As a result, the conventional projector has a problem in that there is a limitation to the installation space of the projector because an increased space must be provided in rear of the front side of the projector where the projection lens unit is arranged.

SUMMARY OF THE INVENTION

Accordingly, the present invention is directed to a projection lens unit and a thin projector using the same that substantially obviate one or more problems due to limitations and disadvantages of the related art.

An object of the present invention is to provide a projection lens unit which includes an optical system having an arrangement capable of minimizing the space of the optical system, thereby reducing the thickness of a projector using the projection lens unit, and to provide the projector using the projection lens unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projection lens unit comprises: a plurality of lens sets for emitting light carrying an image; and a reflector arranged between adjacent ones of the lens sets or at a downstream end of the lens sets, and adapted to change a direction of light incident on the reflector.

The plurality of lens sets may comprise a first lens set, a second lens set, a third lens set, and a fourth lens set. The first lens set may include at least one focus adjusting lens. The second lens set may include at least one zoom lens. The third lens set may include at least compensation lens. The fourth lens set may include at least one master lens.

The first lens set may be shiftable in parallel to a central axis of light incident on the first lens set, to adjust a focus of the image. The second lens set may be shiftable in parallel to a central axis of light incident on the second lens set, to adjust a focal length of the image.

The reflector may include a fully-reflective mirror or a prism.

In another aspect of the present invention, a thin projector comprises: a housing having a panel shape including a front side, a rear side, a top side, and opposite lateral sides; an illumination unit arranged in the interior of the housing, the illumination unit generating light and emitting the generated light; a micro device arranged in the interior of the housing, the micro device receiving the light from the illumination unit and producing an image using the received light; a projection lens unit arranged in the interior of the housing, the projection lens unit including a plurality of lens sets for emitting the image produced by the micro device, and a reflector arranged between adjacent ones of the lens sets or at a downstream end of the lens sets, and adapted to change a direction of light incident on the reflector, one of the lens units and reflector being arranged to be externally exposed through the front side of the housing; and fixing means adapted to fix the housing such that the housing is arranged in an upright state.

The housing may be attached to a wall or a ceiling, or may be installed on a floor in an upright state. Each lateral side of the housing may have an area smaller than an area of the front or rear side of the housing. The top or bottom side of the housing may have an area smaller than an area of the front or rear side of the housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The concept of the present invention is to reduce the installation space of a projector by configuring an optical system of the projector such that the thickness of the projector is reduced.

FIGS. 4A to 4E are views illustrating various embodiments of a projection lens unit according to the present invention, respectively.

As shown in FIGS. 4A to 4E, the projection lens unit according to the present invention mainly includes a plurality of lens sets and a reflector 13.

The reflector 13 is arranged between adjacent ones of the lens sets or at the downstream end of the lens sets, to change the direction of incident light.

The reflector 13 may change the direction of light incident thereon such that the direction of light emitted therefrom is perpendicular to the incidence direction. In this case, it is possible to reduce the thickness of a projector, to which the projection lens unit is applied, through a re-arrangement of an optical system of the projector and a micro device used in the projector.

In accordance with an exemplary embodiment of the present invention, the projection lens unit may include first, second, third, and fourth lens sets.

In this case, the first lens set may include at least one focus adjusting lens, and the second lens set may include at least one zoom lens. The third lens set may include at least compensation lens, and the fourth lens set may include at least one master lens.

The first lens set may be shiftable in parallel to the central axis of the light incident on the first lens set, to adjust the focus of an image to be displayed.

The second lens set may be shiftable in parallel to the central axis of the light incident on the second lens set, to adjust the focal length of the image.

For the reflector 13, a fully-reflective mirror or a prism may be used.

The reflector 13 has a reflection surface on which a metal such as aluminum or silver, or a dichroic material may be coated.

Hereinafter, various embodiments of the present invention will be described which are associated with different positions of the reflector 13.

Figure 1:
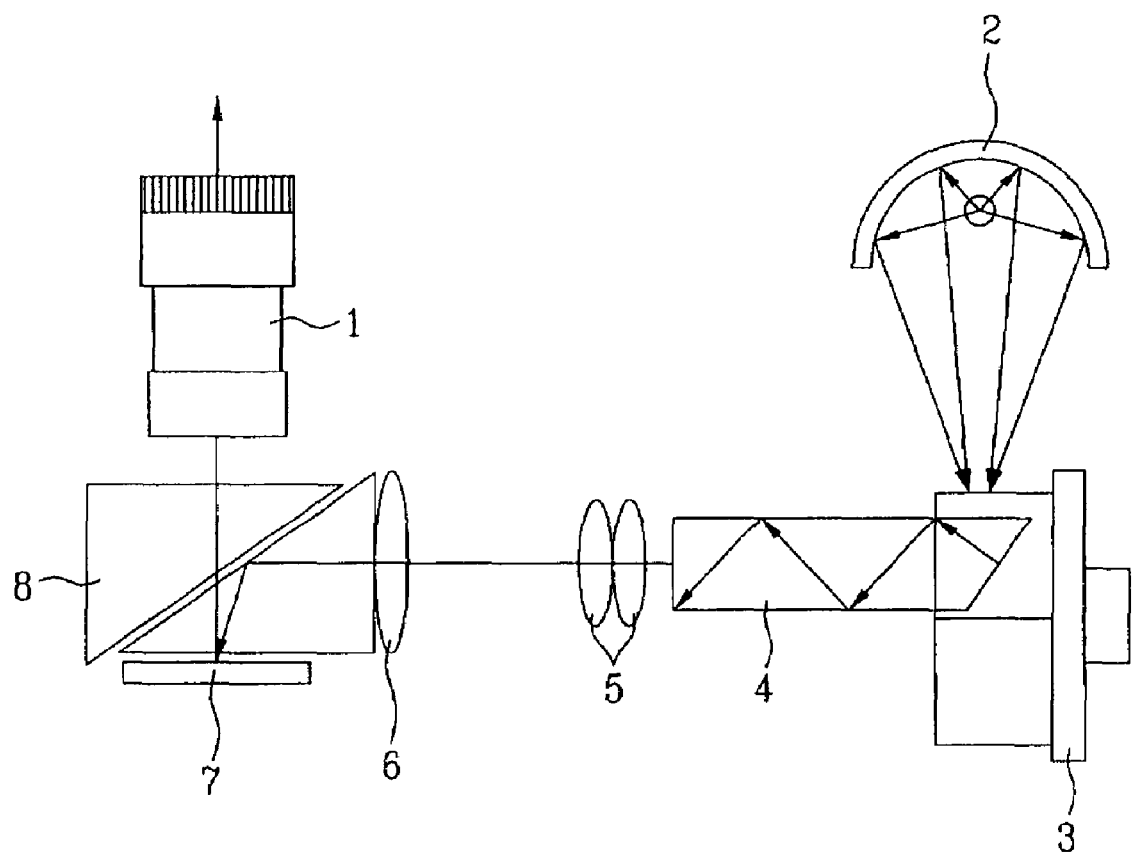
FIG. 1 is a schematic view illustrating an arrangement of a general single panel type projector.
Figure 2:
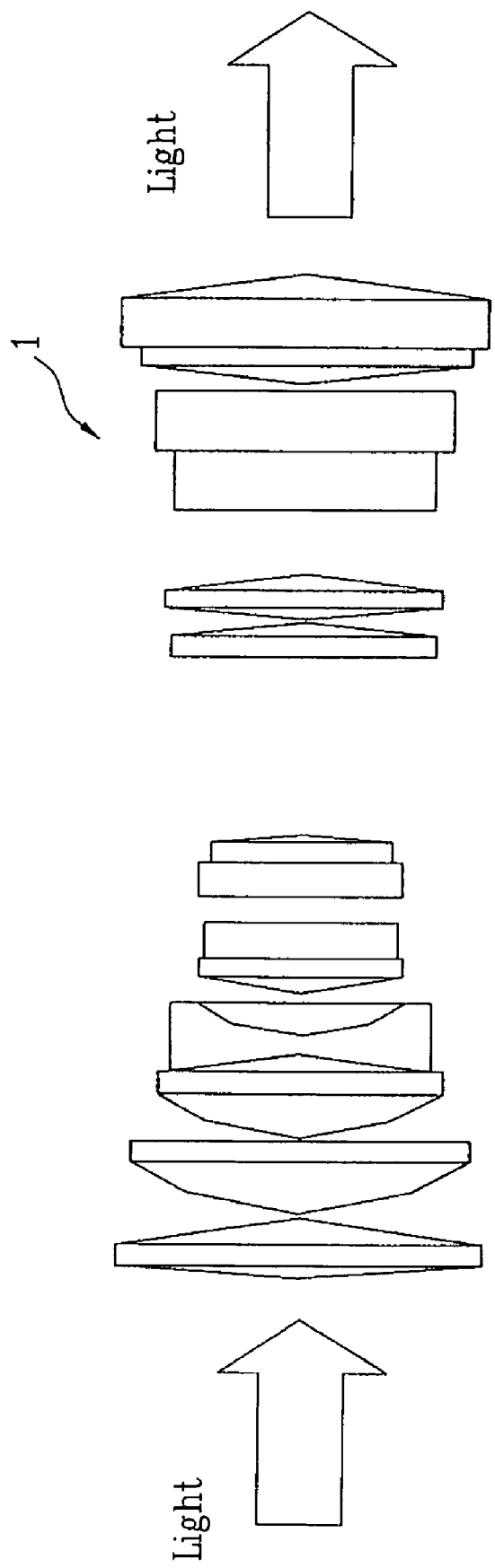
FIG. 2 is a schematic view illustrating an arrangement of a general projection lens unit.
Figure 3:
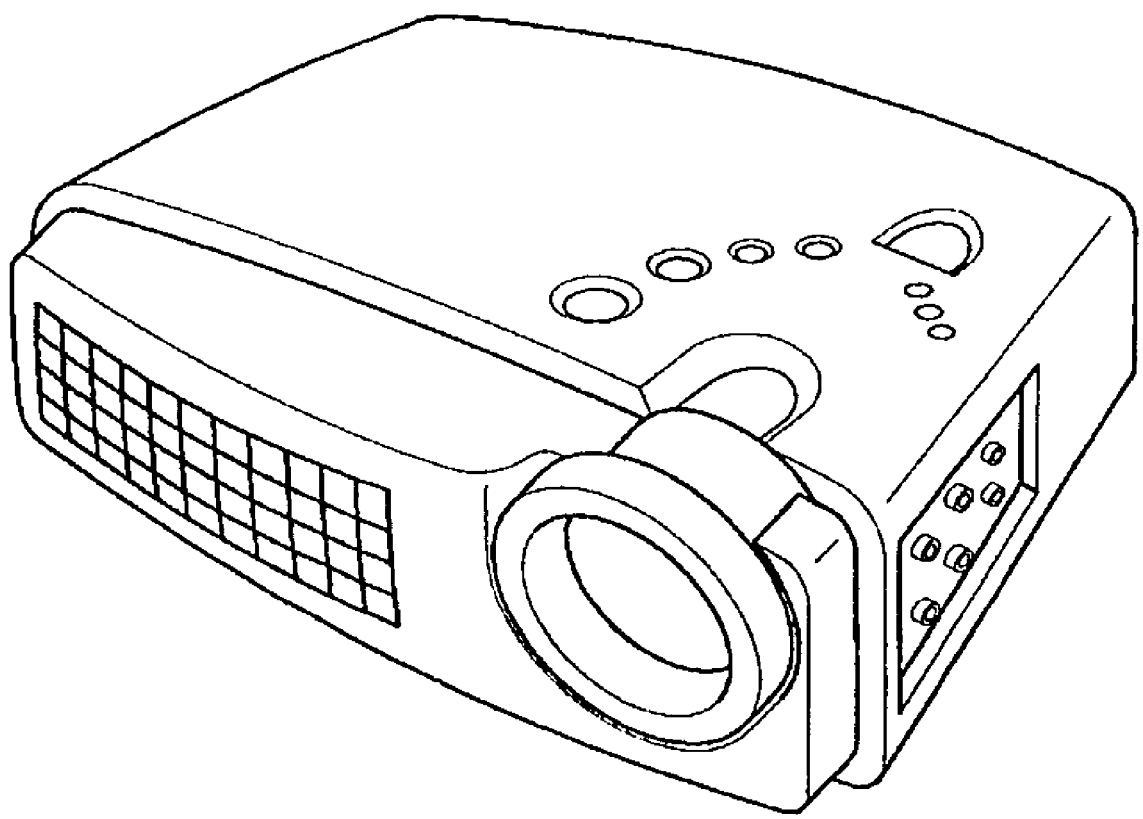
FIG. 3 is a perspective view illustrating an appearance of the projector shown in FIG. 1.
Figure 4A:
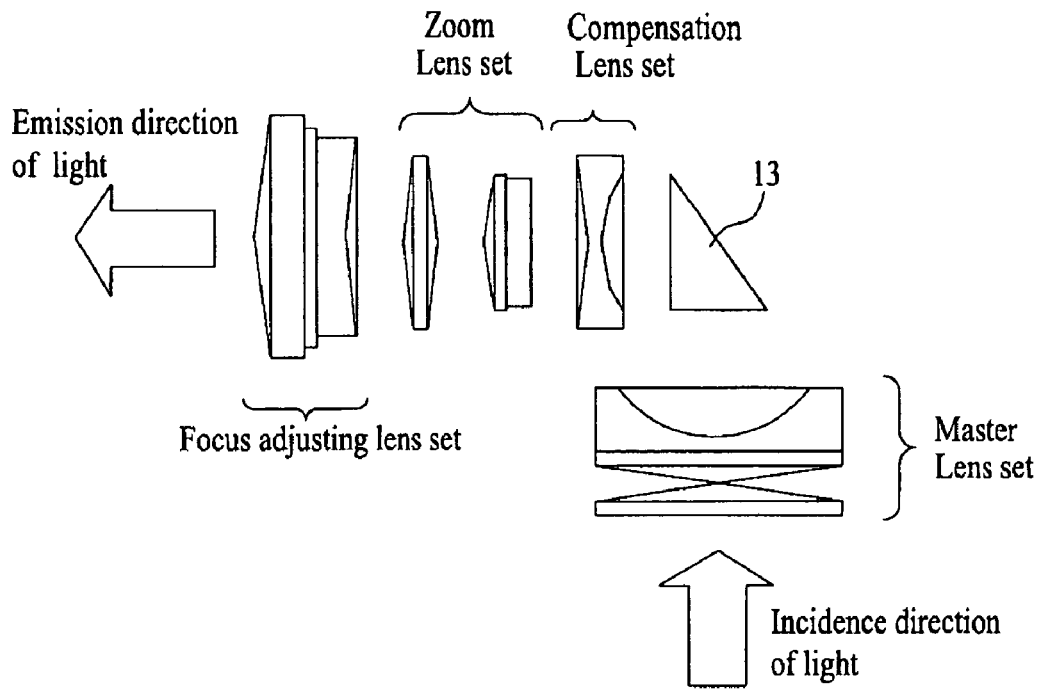
FIGS. 4A to 4E are views illustrating various embodiments of a projection lens unit according to the present invention, respectively.

FIG. 4A illustrates a first embodiment of the present invention in which a master lens set, a reflector 13, a compensation lens set, a zoom lens set, and a focus adjusting lens set are arranged in this order.

The master lens set emits incident light, which carries an image produced by a micro device, to the reflector 13. The reflector 13 is arranged downstream from the master lens set, in order to change the direction of the light emitted from the master lens set.

The compensation lens set compensates light reflected from the reflector 13. The zoom lens set adjusts the focal length of light emitted from the compensation lens set.

The focus adjusting lens set adjusts the focus of light emitted from the zoom lens set, and externally emits the resultant light.

In this case, the compensation lens set, zoom lens set, and focus adjusting lens set are arranged in parallel to the central axis of the light horizontally reflected from the reflector 13 in a horizontally-aligned manner and perpendicularly to the central axis of the light vertically emitted from the master lens set.

Figure 4B:
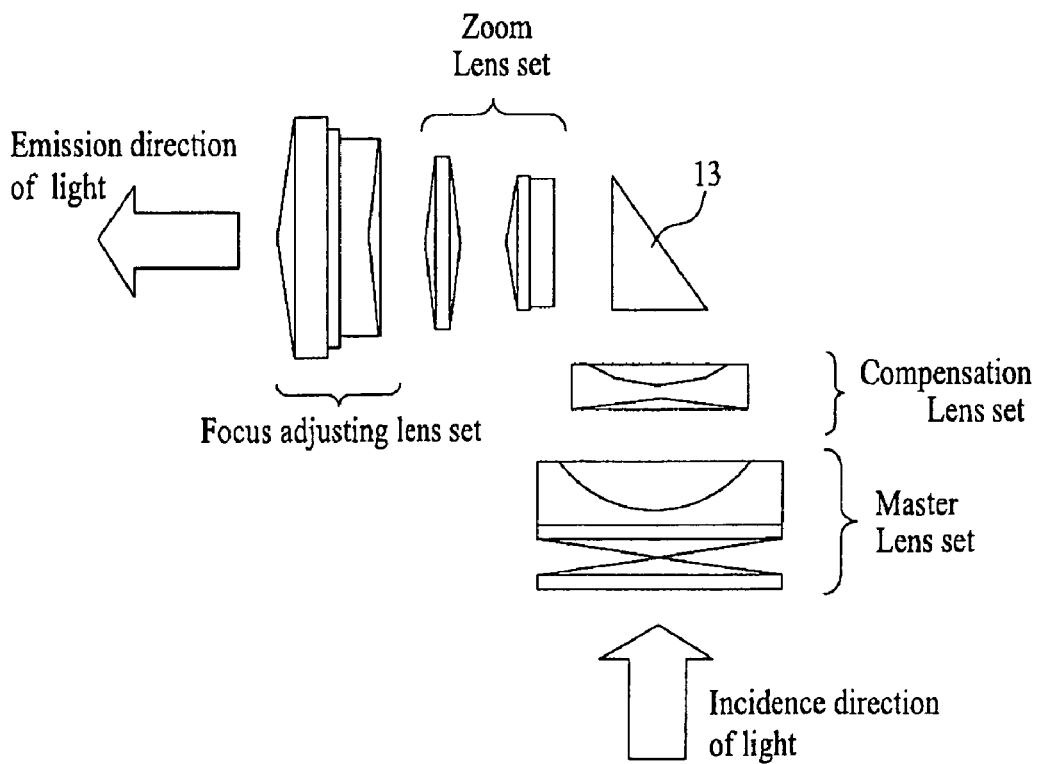

FIG. 4B illustrates a second embodiment of the present invention in which a master lens set, a compensation lens set, a reflector 13, a zoom lens set, and a focus adjusting lens set are arranged in this order.

The master lens set emits incident light carrying an image produced by a micro device. The compensation lens set compensates the light emitted from the master lens set. The reflector 13 is arranged downstream from the compensation lens set, and changes the direction of light emitted from the compensation lens set.

The zoom lens set adjusts the focal length of light reflected from the reflector 13. The focus adjusting lens set adjusts the focus of light emitted from the zoom lens set, and externally emits the resultant light.

In this case, the zoom lens set and focus adjusting lens set are arranged in parallel to the central axis of the light horizontally reflected from the reflector 13 in a horizontally-aligned manner and perpendicularly to the central axis of the light vertically emitted from the master lens set and the central axis of the light vertically emitted from the compensation lens set.

Figure 4C:
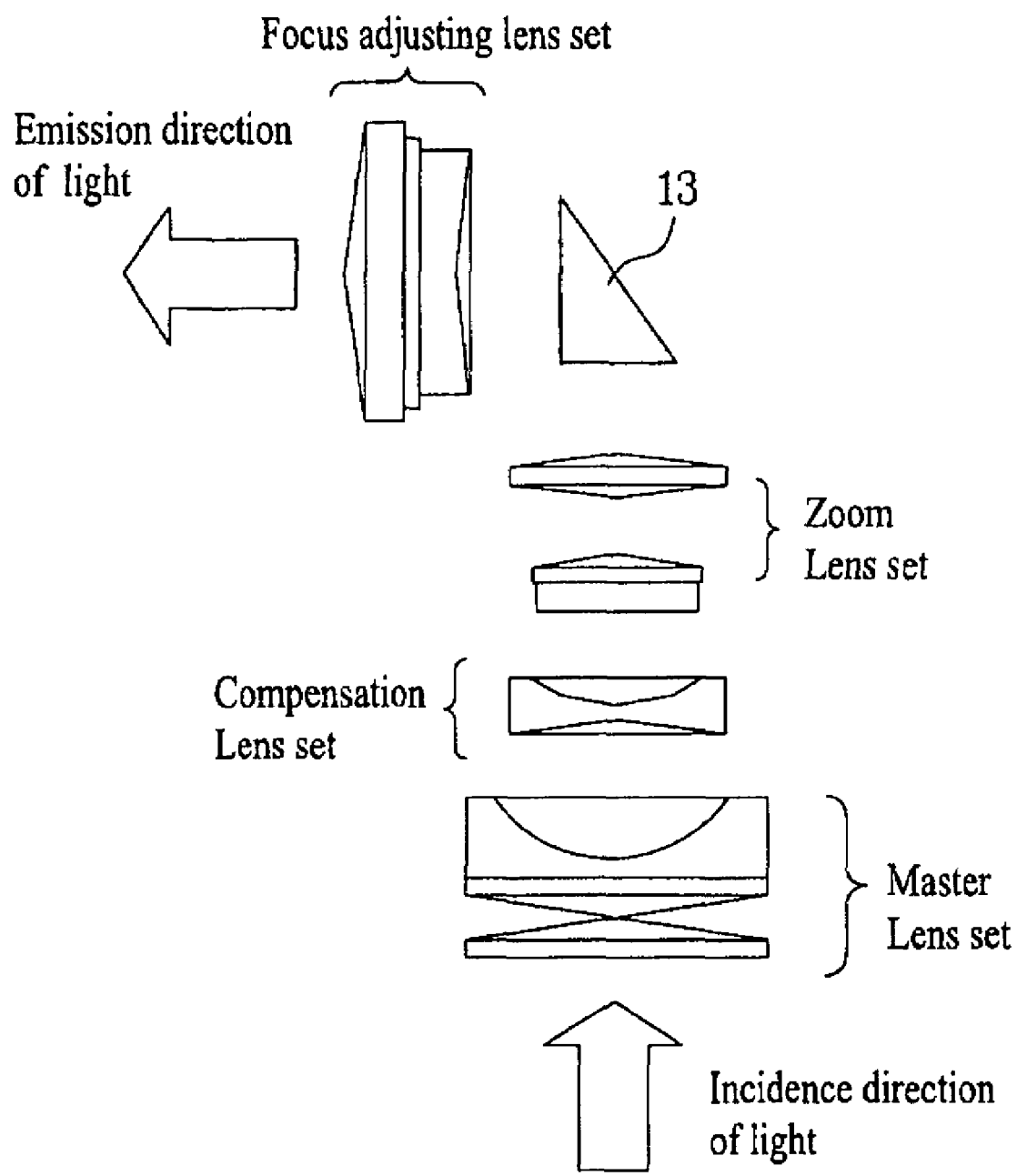

FIG. 4C illustrates a third embodiment of the present invention in which a master lens set, a compensation lens set, a zoom lens set, a reflector 13, and a focus adjusting lens set are arranged in this order.

The master lens set emits incident light carrying an image produced by a micro device. The compensation lens set compensates the light emitted from the master lens set. The zoom lens set adjusts the focal length of light emitted from the compensation lens set.

The reflector 13 is arranged downstream from the zoom lens set, and changes the direction of light emitted from the zoom lens set. The focus adjusting lens set adjusts the focus of light reflected from the reflector 13, and externally emits the resultant light.

In this case, the focus adjusting lens set is arranged in parallel to the central axis of the light horizontally reflected from the reflector 13 in a horizontally-aligned manner and perpendicularly to the central axis of the light vertically emitted from the master lens set, the central axis of the light vertically emitted from the compensation lens set, and the central axis of the light vertically emitted from the zoom lens set.

Figure 4D:
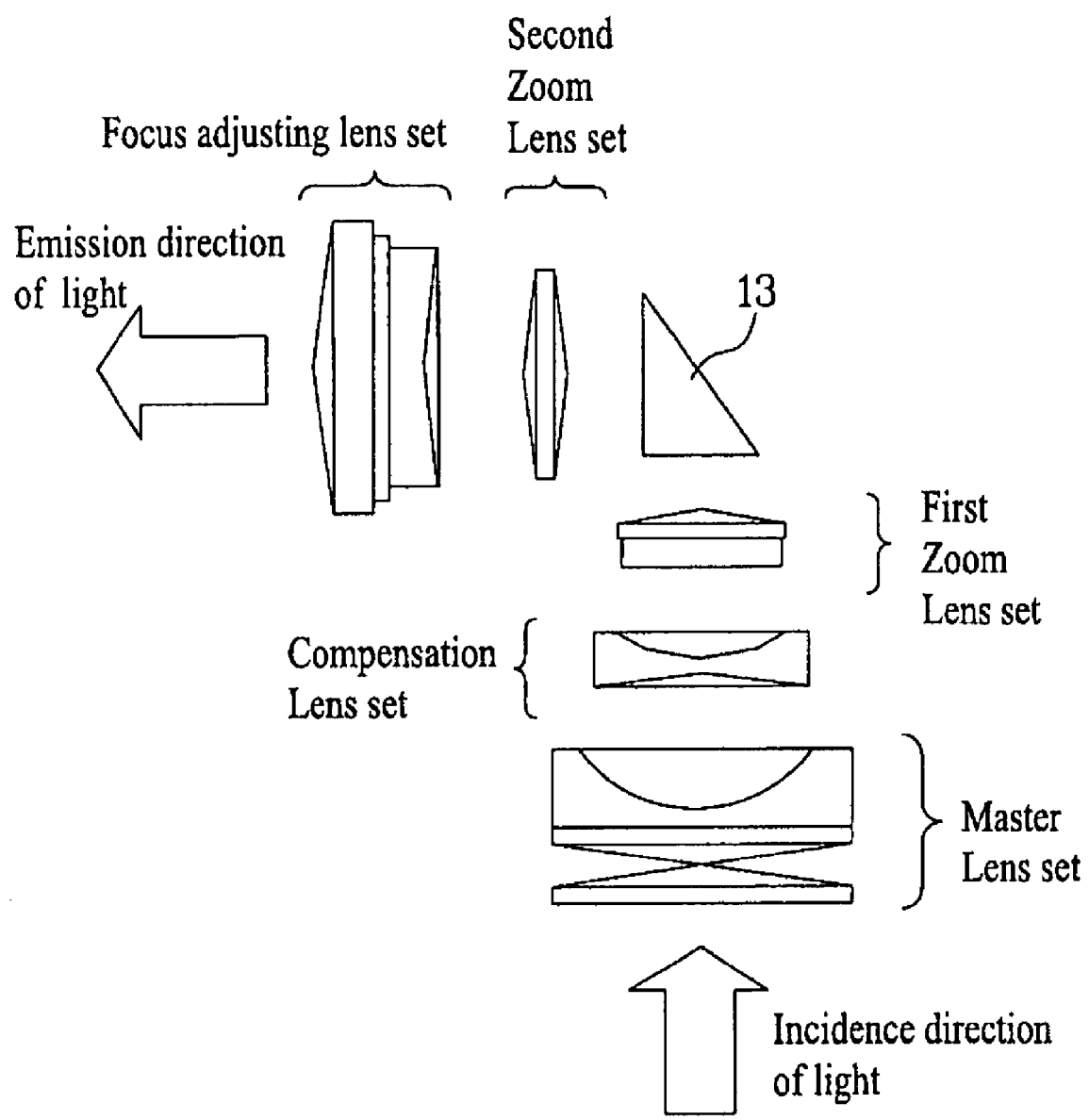

FIG. 4D illustrates a fourth embodiment of the present invention in which a master lens set, a compensation lens set, a first zoom lens set, a reflector 13, a second zoom lens set, and a focus adjusting lens set are arranged in this order.

The master lens set emits incident light carrying an image produced by a micro device. The compensation lens set compensates the light emitted from the master lens set. The first zoom lens set primarily adjusts the focal length of light emitted from the compensation lens set.

The reflector 13 is arranged downstream from the first zoom lens set, and changes the direction of light emitted from the first zoom lens set. The second zoom lens set secondarily adjusts the focal length of light reflected from the reflector 13.

The focus adjusting lens set adjusts the focus of light emitted from the second zoon lens set, and externally emits the resultant light.

In this case, the second zoom lens set and focus adjusting lens set are arranged in parallel to the central axis of the light horizontally reflected from the reflector 13 in a horizontally-aligned manner and perpendicularly to the central axis of the light vertically emitted from the master lens set, the central axis of the light vertically emitted from the compensation lens set, and the central axis of the light vertically emitted from the first zoom lens set.

Figure 4E:
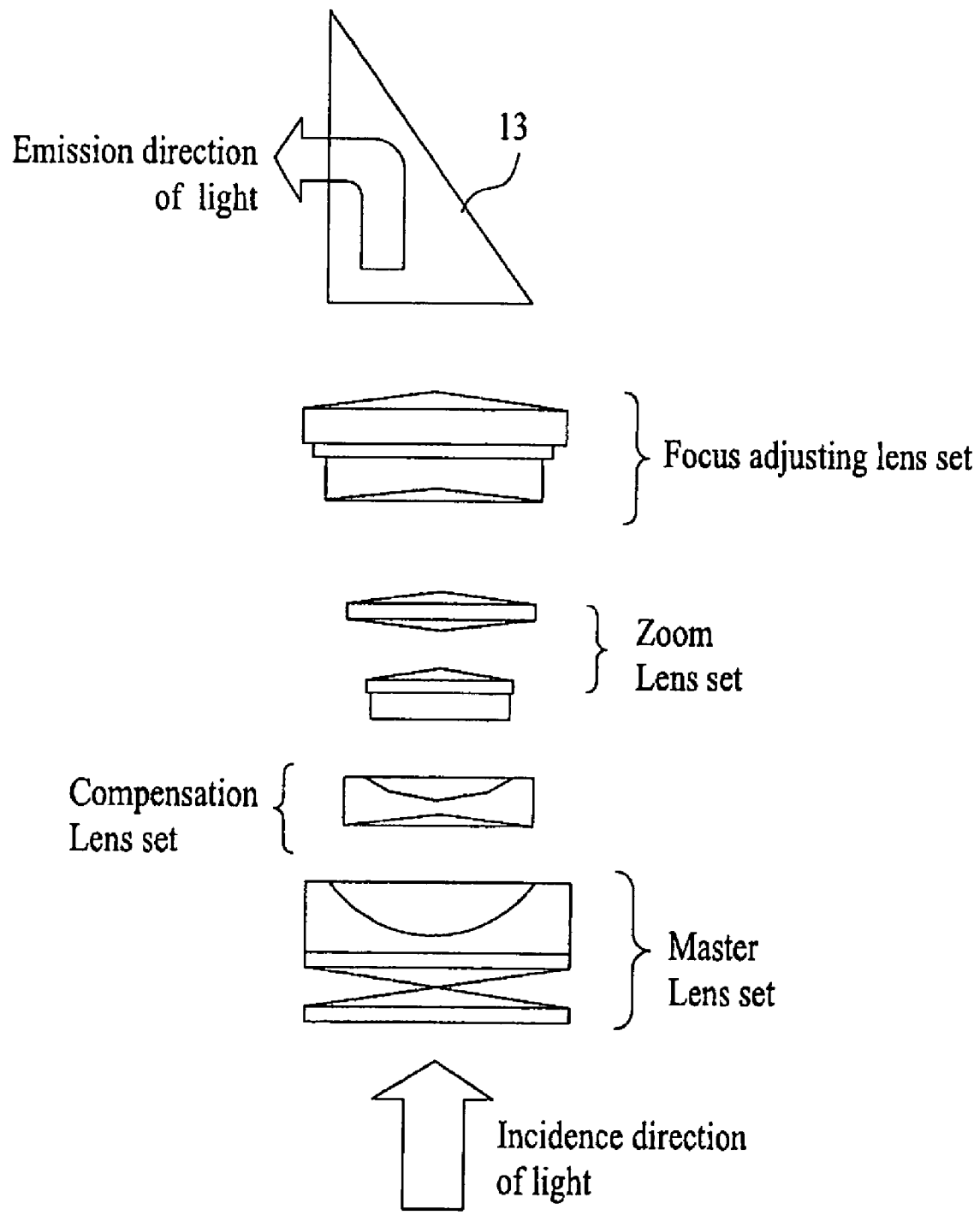

FIG. 4E illustrates a fifth embodiment of the present invention in which a master lens set, a compensation lens set, a zoom lens set, a focus adjusting lens set, and a reflector 13 are arranged in this order.

The master lens set emits incident light carrying an image produced by a micro device. The compensation lens set compensates the light emitted from the master lens set. The zoom lens set adjusts the focal length of light emitted from the compensation lens set.

The focus adjusting lens set adjusts the focus of light emitted from the zoom lens set. The reflector 13 is arranged downstream from the focus lens set, and changes the direction of light emitted from the focus adjusting lens set, and externally emits the resultant light.

In this case, the master lens set, compensation lens set, zoom lens set, and focus adjusting lens set are arranged in parallel to the central axis of the incident light in a vertically-aligned manner.

Hereinafter, the projector according to the present invention will be described which uses the projection lens unit having the above-described arrangement according to any one of the embodiments of the present invention.

Figure 5A:
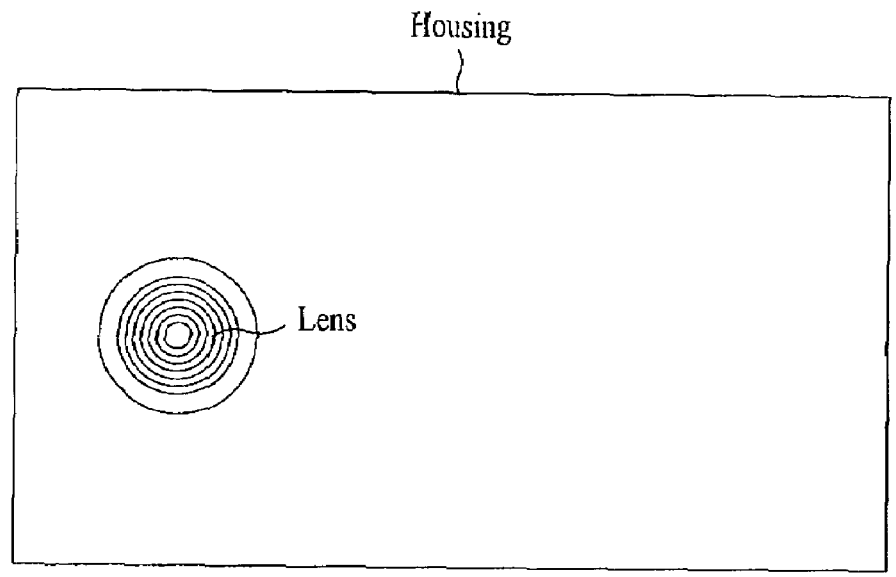
FIG. 5A is a front view illustrating a front side of a thin projector using the projection lens unit according to the present invention.
Figure 5B:
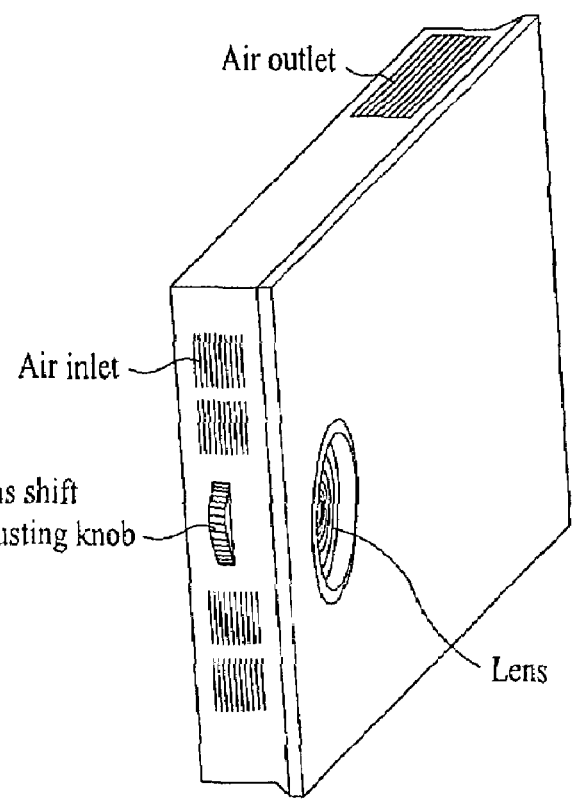
FIGS. 5B and 5C are perspective views illustrating opposite lateral sides of the thin projector using the projection lens unit according to the present invention, respectively.
Figure 5C:
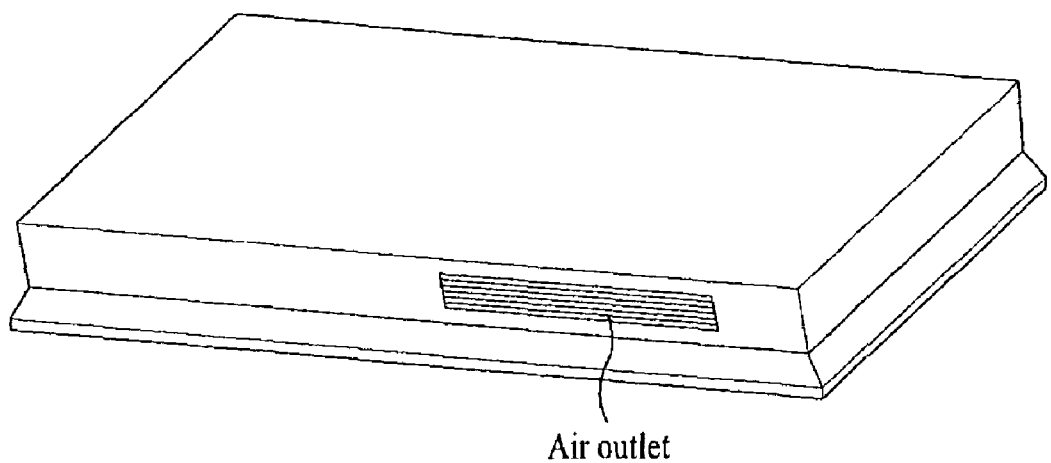
Figure 5D:
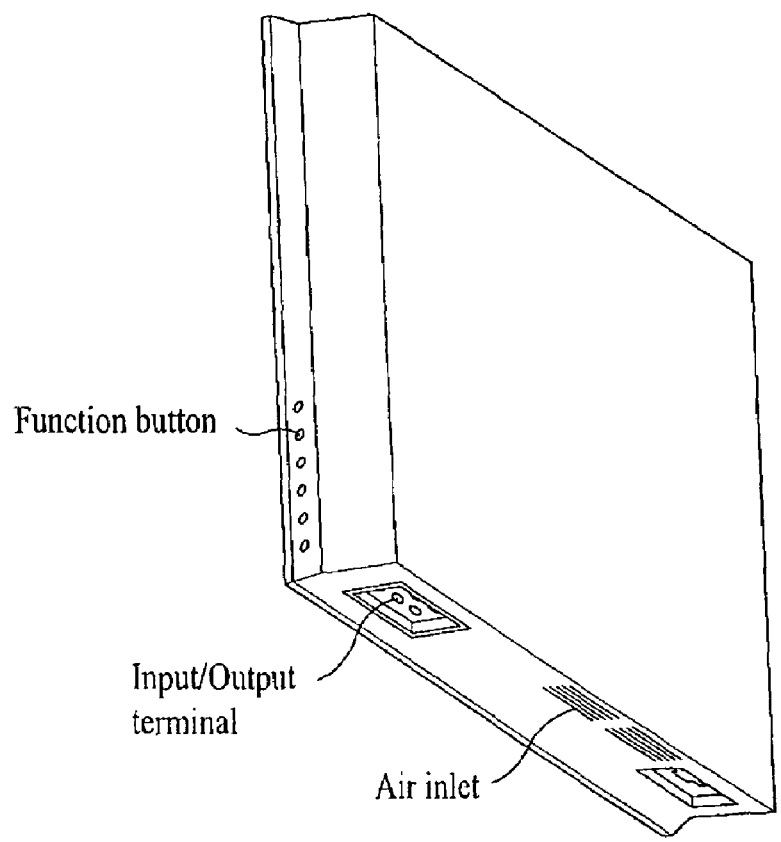
FIGS. 5D and 5E are perspective views illustrating top and bottom sides of the thin projector using the projection lens unit according to the present invention, respectively.
Figure 5E:
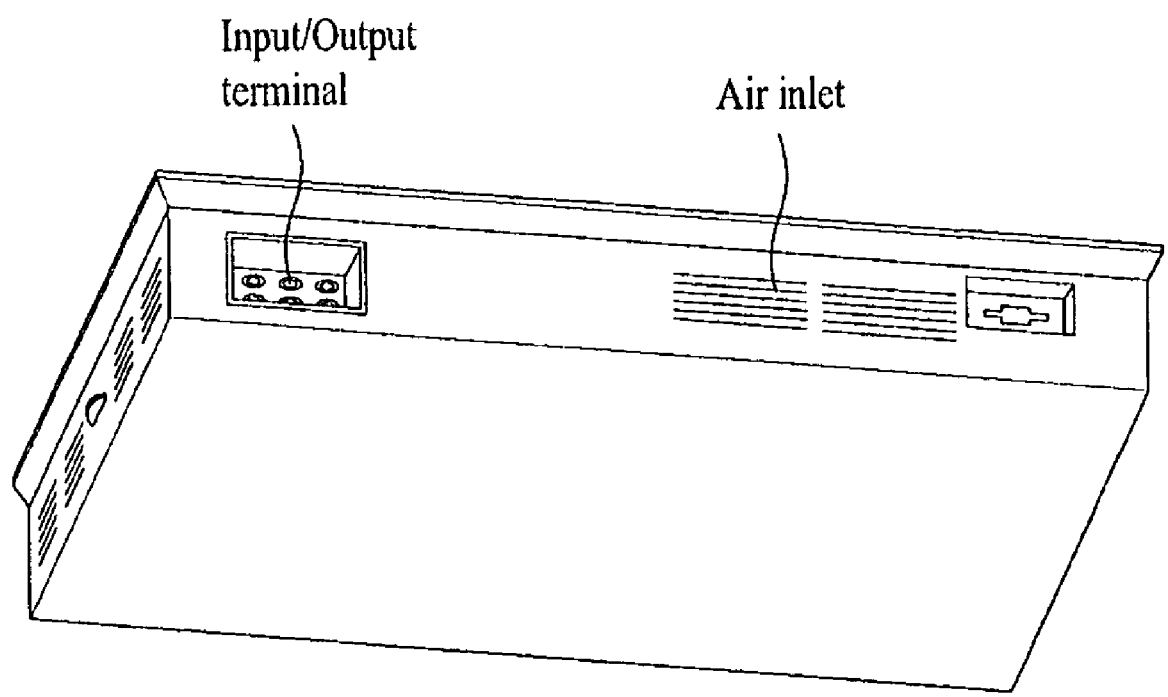

FIG. 5A is a front view illustrating a front side of a thin projector which uses the projection lens unit according to the present invention. FIGS. 5B and 5C are perspective views illustrating opposite lateral sides of the thin projector according to the present invention, respectively. FIGS. 5D and 5E are perspective views illustrating top and bottom sides of the thin projector according to the present invention.

As shown in FIGS. 5A to 5E, the thin projector of the present invention mainly includes an illumination unit, a micro device, and a projection lens unit. The thin projector also includes a housing which protects the constituent elements of the projector.

The housing has a panel shape, and is fixed in an upright state by a fixing means.

The housing may be configured such that each lateral side of the housing has an area smaller than the area of the front or rear side of the housing, or the top or bottom side of the housing has an area smaller than the area of the front or rear side of the housing.

The front and rear sides of the housing may have the same area or different areas. The front side of the housing may have horizontal and vertical lengths which are identical to or different from each other.

It is preferred that the housing have a thickness corresponding to 50% or less of the horizontal length of the housing.

The projection lens unit is arranged in the housing, and includes a lens arranged at a predetermined region of the front side of the housing such that the lens is outwardly exposed from the housing, to project an image onto a screen arranged in front of the projector.

The micro device reproduces an image, and transmits the reproduced image to the projection lens unit. The illumination unit generates light, and emits the generated light to the micro device.

Detailed description of the projection lens unit, micro device, and illumination unit will be described hereinafter.

Figure 6:
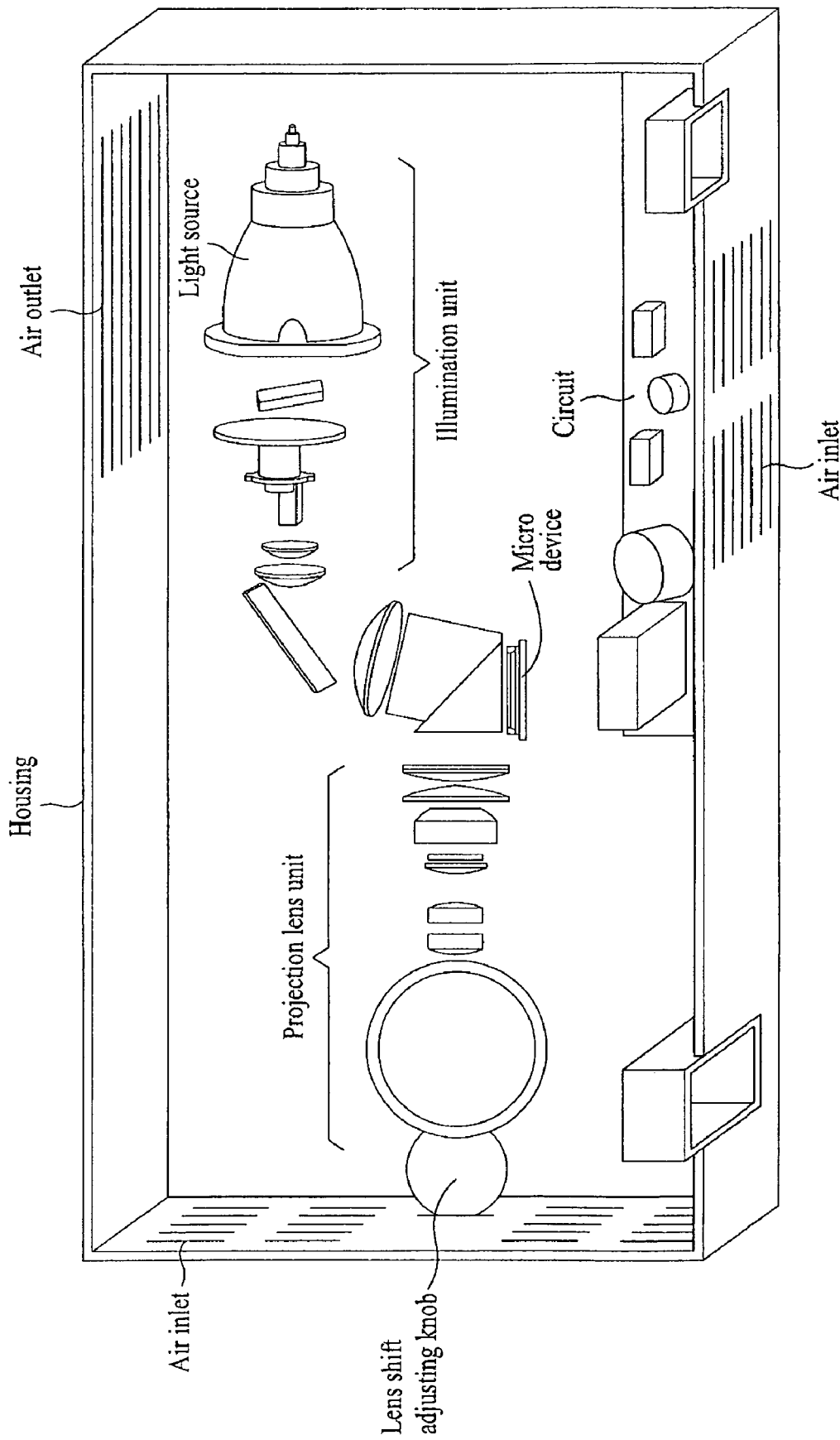
FIG. 6 is a perspective view illustrating the interior of the thin projector using the projection lens unit according to the present invention.

FIG. 6 is a perspective view illustrating the interior of the thin projector according to the present invention.

As shown in FIG. 6, it is preferred that, in the thin projector of the present invention, the projection lens unit be arranged at one lateral side of the housing, the illumination unit be arranged at the top side of the housing, and a driving circuit, which drives the projection lens unit, illumination unit, and micro device, be arranged at the bottom side of the housing.

A lens shift adjusting knob is outwardly exposed from one lateral side of the housing where the projection lens unit is arranged. The lens shift adjusting knob serves to shift the projection lens unit.

It is also preferred that air inlets be formed at the lateral side of the housing where the projection lens unit is arranged and at the bottom side of the housing in a region where the driving circuit is arranged, respectively. Also, it is preferred that an air outlet be arranged at the top side of the housing in a region where the illumination unit is arranged.

A light source, which is included in the illumination unit, may be arranged beneath the air outlet.

The reason why the light source is arranged beneath the air outlet is that rapid and efficient cooling can be achieved where the light source is arranged near the air outlet because the light source generates a large amount of heat, as compared to other elements.

If the projector is installed such that the housing is arranged in an inverted state or is unstably arranged, there may be a danger of fire due to the light source which generates a large amount of heat.

Therefore, it is preferred that a sensor be installed in a housing to sense the inclination of the housing, and thus, to cut off electric power supplied to the illumination unit when the inclination of the housing is higher than a reference inclination.

The sensor may be a gravity sensor such as a gyro sensor.

In order to achieve an enhancement in the cooling efficiency of the projector, fans are installed over and beneath the projection lens unit and beneath the illumination unit, respectively.

In the illustrated case, there are a plurality of fans, namely, a first fan arranged over the projection lens unit, a second fan arranged beneath the projection lens unit, a third fan arranged beneath an illumination lens set of the illumination unit, and a fourth fan arranged beneath the light source of the illumination unit.

Accordingly, air is introduced into the interior of the projector through the air inlets arranged at one lateral side and bottom side of the projector by the first and second fans, respectively, and is then discharged through the air outlet arranged at the top side of the projector by the third and fourth fans.

In a particular air flow path design, the number of the fans may be adjusted to efficiently cool the projector.

Hereinafter, the optical system of the thin projector according to the present invention will be described.

Although a variety of optical systems may be applied to the thin projector of the present invention in order to realize a desired thickness reduction of the thin projector, an "I"-shaped optical system or "L"-shaped optical system may be applied to the thin projector in accordance with an embodiment of the present invention.

Figure 7A:
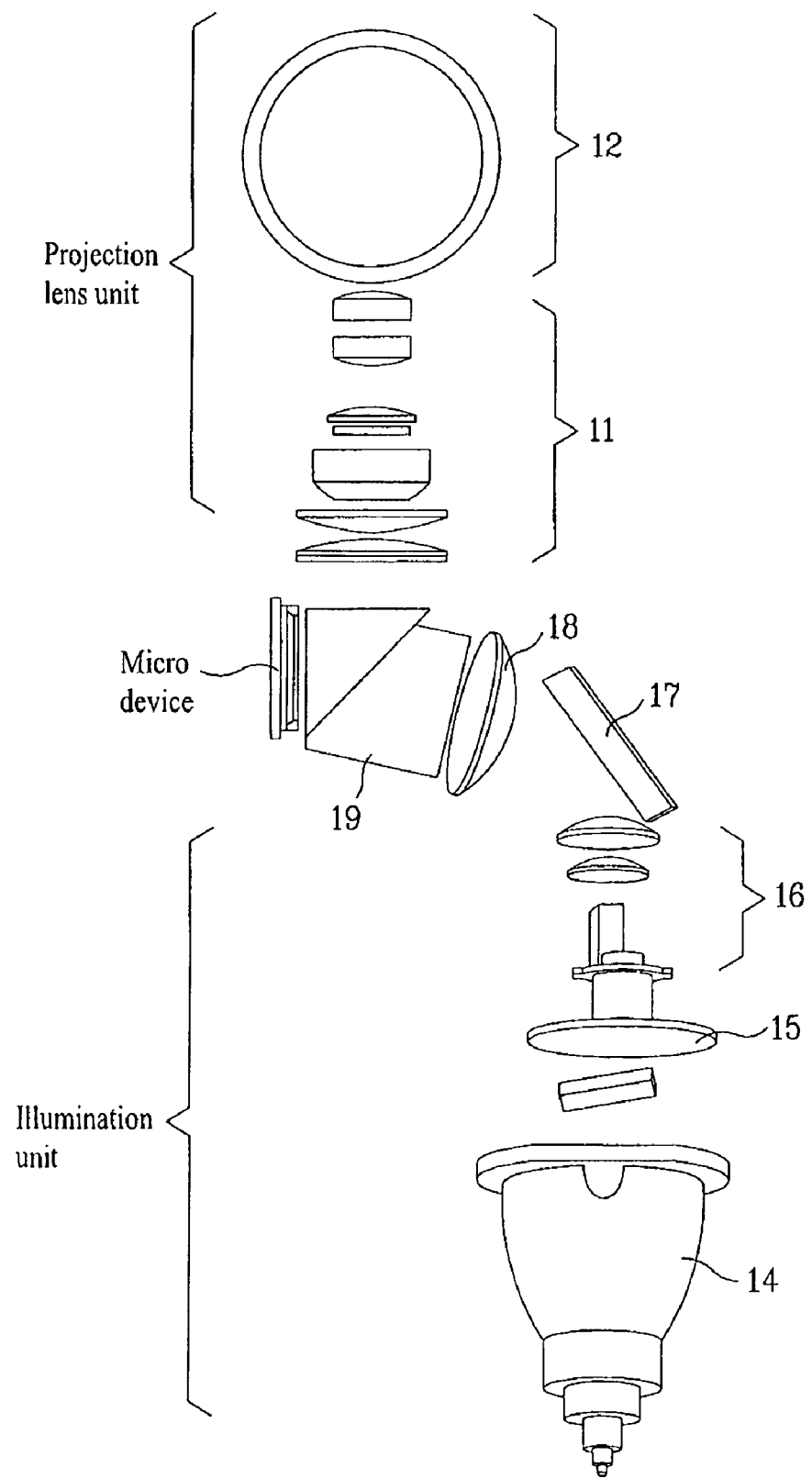
FIG. 7A is a front view illustrating an "I"-shaped optical system which is included in the thin projector according to the present invention.
Figure 7B:
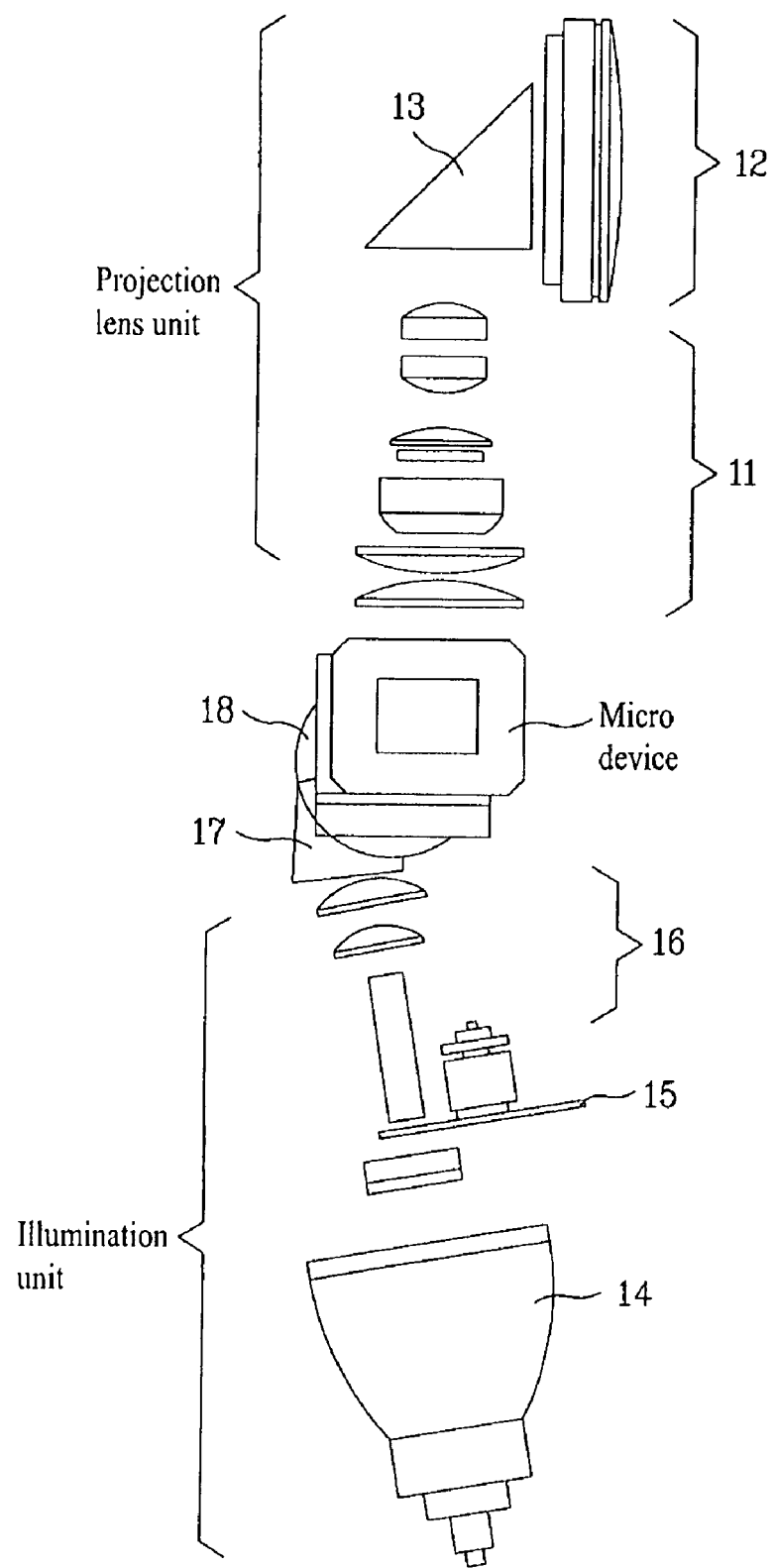
FIG. 7B is a side view illustrating the "I"-shaped optical system which is included in the thin projector according to the present invention.
Figure 8A:
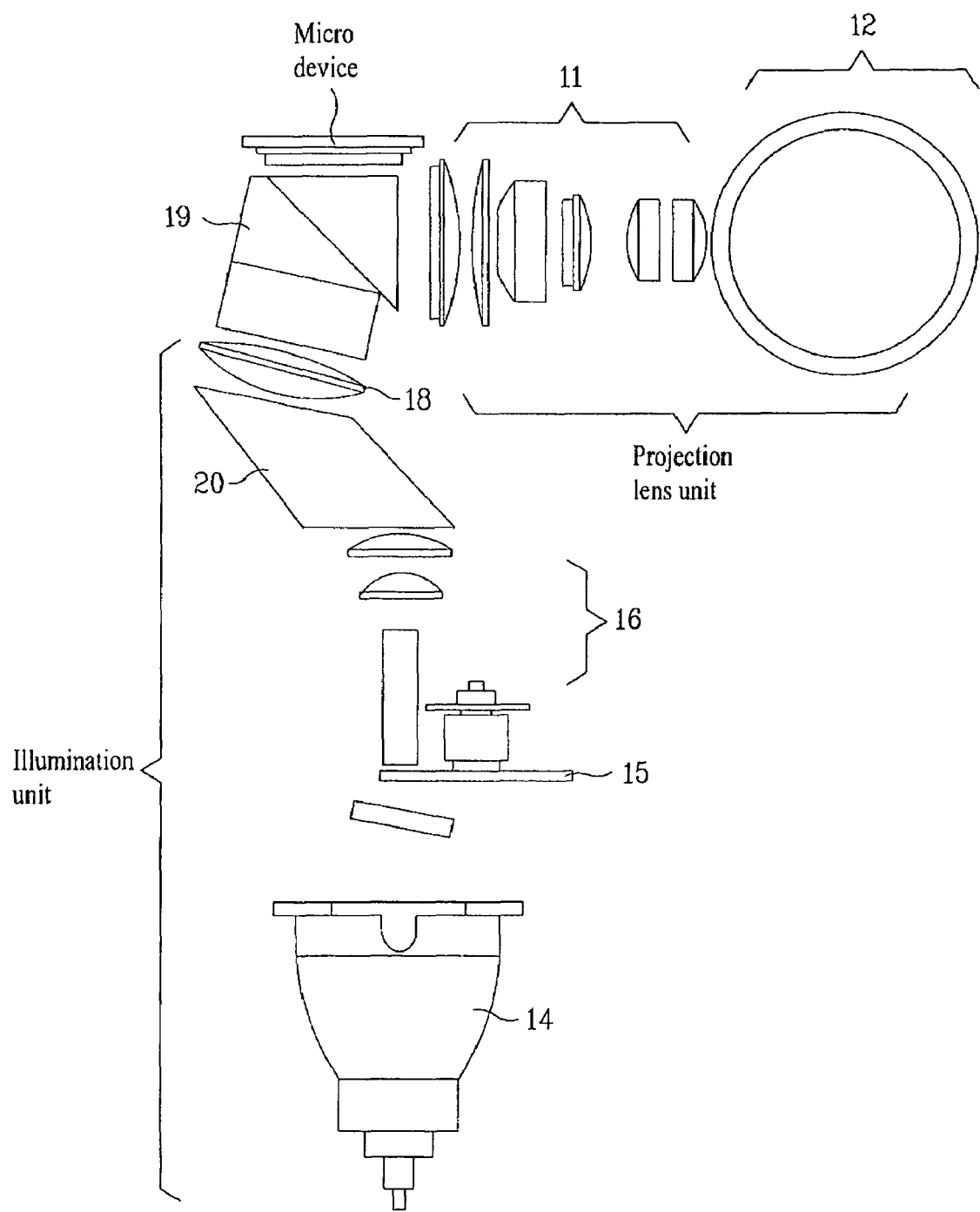
FIG. 8A is a front view illustrating an "L"-shaped optical system which is included in the thin projector according to the present invention.
Figure 8B:
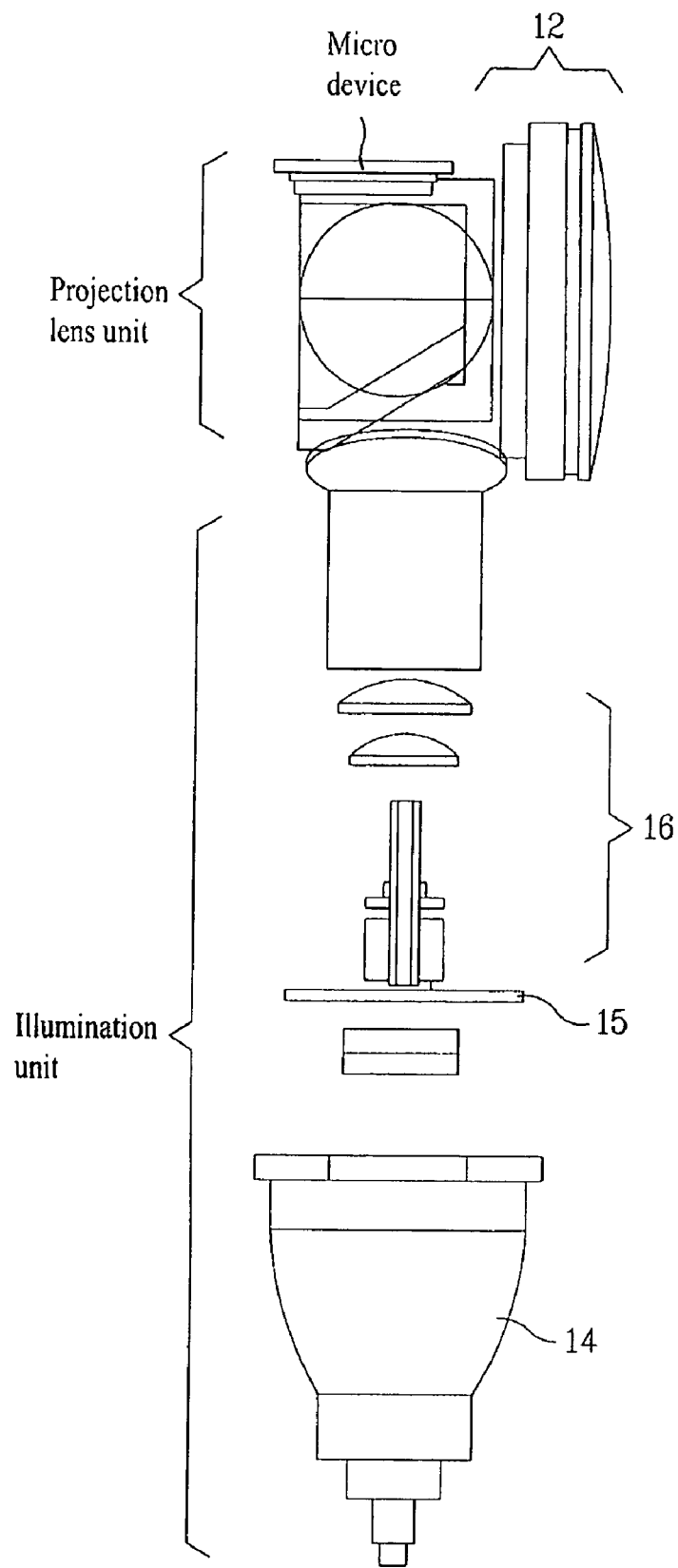
FIG. 8B is a side view illustrating the "L"-shaped optical system which is included in the thin projector according to the present invention.

FIG. 7A is a front view illustrating an "I"-shaped optical system which is included in the thin projector according to the present invention. FIG. 7B is a side view illustrating the "I"-shaped optical system which is included in the thin projector according to the present invention. FIG. 8A is a front view illustrating an "L"-shaped optical system which is included in the thin projector according to the present invention. FIG. 8B is a side view illustrating the "L"-shaped optical system which is included in the thin projector according to the present invention.

As shown in FIGS. 7A, 7B, 8A, and 8B, the optical system of the thin projector according to the present invention mainly includes a projection lens unit, a micro device, and an illumination unit in either case of FIGS. 7A and 7B or FIGS. 8A and 8B.

The projection lens unit includes a first lens set 11, a second lens set 12, and a reflector 13.

The first lens set 11 functions to emit light carrying an image produced by the micro device. The second lens set 12 is arranged perpendicularly to the central axis of the light emitted from the first lens set 11, to project the light emitted from the first lens set 11 onto an external screen.

The reflector 13 is arranged between the first lens set 11 and the second lens set 12, to change the direction of the light emitted from the first lens set 11 such that the light is incident on the second lens set 12.

The first lens set 11 is shiftable perpendicularly to the central axis of the light emitted from the second lens set 12. The first lens set 11 may include at least one focusing lens which adjusts the focus of the image incident thereon.

The second lens set 12 is shiftable perpendicularly to the central axis of the light emitted from the first lens set 11. The second lens set 12 may include at least one zoom lens which adjusts the focal length of the image incident thereon.

The entire portion of the projection lens unit, which includes the first and second lens sets 11 and 12, is shiftable in a vertical direction of the front side of the housing, to adjust the position of the image projected onto the screen.

Figure 9:
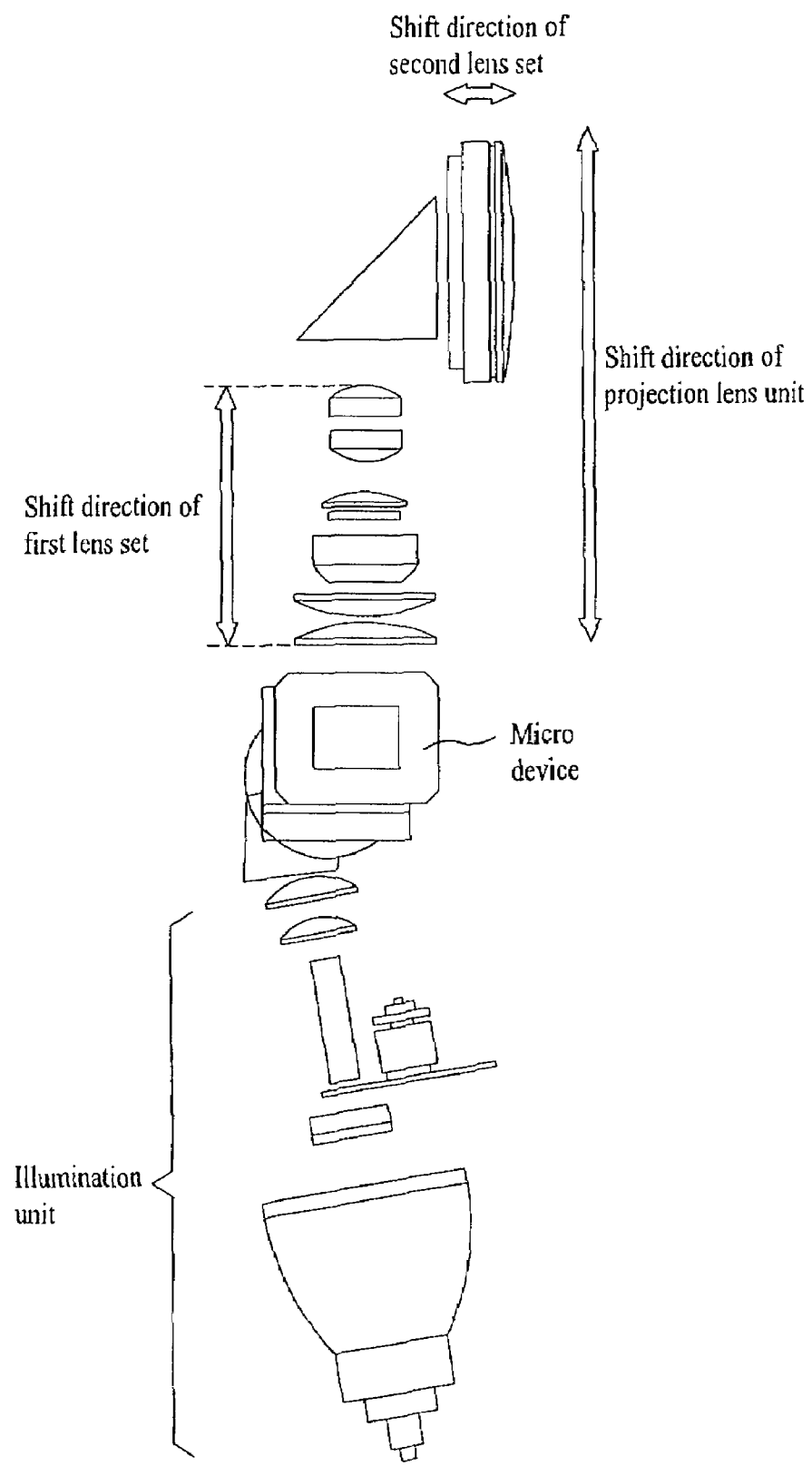
FIG. 9 is a schematic view illustrating the shift direction of a projection lens unit in the thin projector according to the present invention.

FIG. 9 is a schematic view illustrating the shift direction of the projection lens unit in the thin projector according to the present invention. As shown in FIG. 9, the first lens set 11 is shiftable perpendicularly to the optical axis of the second lens set 12, and the second lens set 12 is shiftable perpendicularly to the optical axis of the first lens set 11.

The entire portion of the projection lens unit including the first and second lens sets 11 and 12 is shiftable perpendicularly to the optical axis of the second lens set 12, to adjust the position of the image projected onto the screen.

The reflector 13 may include a fully-reflective mirror or prism.

In accordance with the present invention, the first and second lens sets 11 and 12 are arranged such that the central axis of the light emitted from the first lens set 11 is perpendicular to the central axis of the light emitted from the second lens set 12.

It is preferred that the first and second lens sets 11 and 12 be arranged perpendicularly to an image display face of the micro device.

The micro device may be an LCD panel, an LCOS panel, or a DMD panel.

Meanwhile, the illumination unit may include a light source 14, a first illumination lens set 16, a second illumination lens set 18, and a first prism 19.

The first illumination lens set 16 functions to provide a uniform brightness of light emitted from the light source 14. The second illumination lens set 18 functions to converge the light emitted from the first illumination lens set 16.

The first illumination lens set 16 may include a light tunnel which functions to provide a uniform brightness of light, and at least one condensing lens. The second illumination lens set 18 may include at least one condensing lens which functions to converge light.

The first prism 19 functions to cause the light emitted from the second illumination lens set 18 to be incident on the micro device, and to cause the light emitted from the micro device to be incident on the first lens set 11 of the projection lens unit.

The first prism 19 may be a total internal reflection (TIR) prism. It is preferred that the first prism 19 be arranged over the image display face of the micro device.

The illumination unit may further include a color wheel 15 which is arranged between the light source 14 and the first illumination lens set 16, to separate the light emitted from the light source 14 into color light components, and a mirror 17 or a second prism 20 which is arranged between the first illumination lens set 16 and the second illumination lens set 18, to reflect the light emitted from the first illumination lens set 16 to the second illumination lens set 18.

In the "I"-shaped optical system shown in FIG. 7A, the mirror 17 is used. The second prism 20 is used in the "L"-shaped optical system shown in FIG. 8A.

The reason why the mirror 17 or second prism 20 is used is to arrange the first and second illumination lens sets 16 and 18 on different optical axes, respectively, in order to reduce the total length of the projector.

That is, the light source 14 and the first illumination lens set 16 are arranged on the same optical axis, and the first and second illumination lens sets 16 and 18 are arranged on different optical axes, respectively.

The optical axis of light emitted from the first illumination lens set 16 is bent from the optical axis of light emitted from the second illumination lens set 18 by a predetermined angle.

The second illumination lens set 16 and the first prism 19 are arranged on the same optical axis, in order to enable uniform incidence of light on the first prism 19.

The first illumination lens set 16 and the first lens set 11 of the projection lens unit may be arranged on different optical axes parallel to each other or meeting each other.

The second illumination lens set 16 and the first lens set 11 of the projection lens unit may also be arranged perpendicularly to each other.

The projector according to the present invention may be configured such that the projector is attachable to a wall or a ceiling.

Figure 10A:
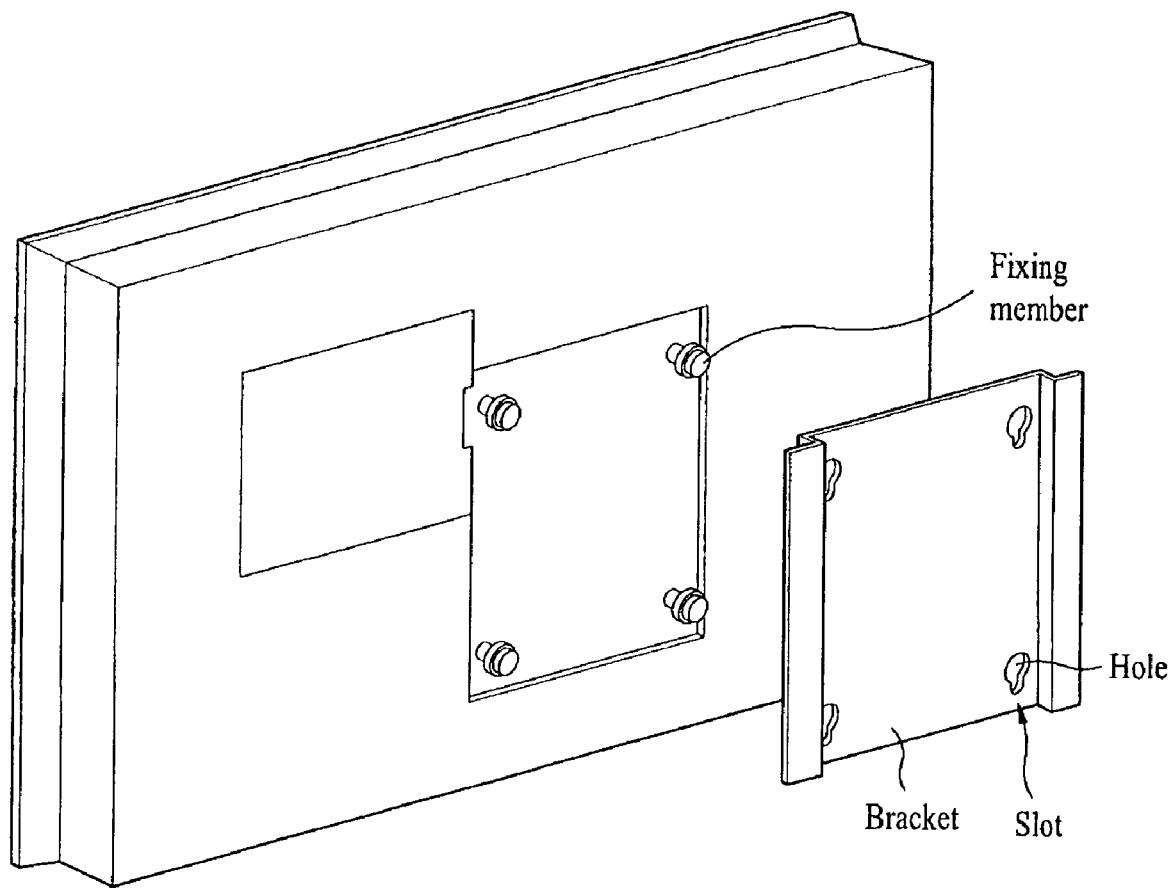
FIG. 10A is a rear view illustrating a wall-mounted thin projector according to an embodiment of the present invention.
Figure 10B:
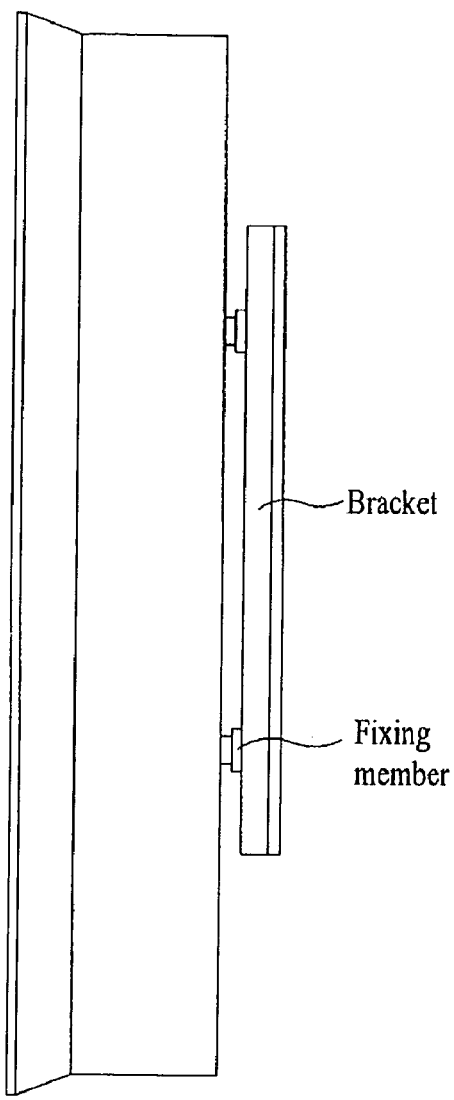
FIG. 10B is a side view corresponding to FIG. 10A.
Figure 10C:
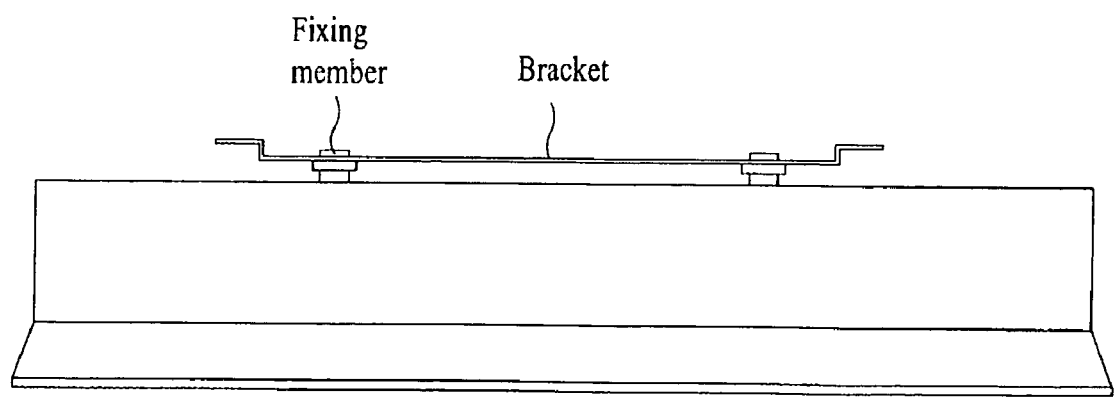
FIG. 10C is a plan view corresponding to FIG. 10A.

FIG. 10A is a rear view illustrating a wall-mounted thin projector according to an embodiment of the present invention. FIG. 10B is a side view corresponding to FIG. 10A. FIG. 10C is a plan view corresponding to FIG. 10A.

As shown in FIGS. 10A, 10B, and 10C, a fixing means such as a bracket must be used to mount the projector of the present invention to a wall.

In accordance with an embodiment of the present invention, fixing members are mounted to a rear side of the thin projector, and the bracket is fixed to the fixing members.

The bracket has slotted holes at four corners, respectively, so that the bracket can be fixed to the fixing members.

Figure 11A:
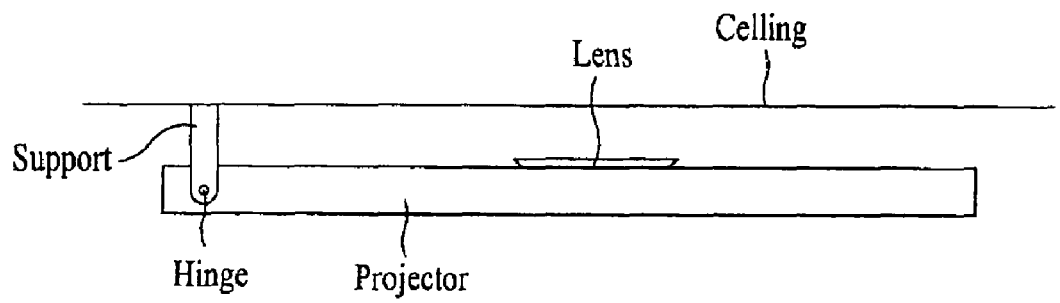
FIGs. 11A and 11B are side views illustrating a ceiling-mounted thin projector according to an embodiment of the present invention.
Figure 11B:
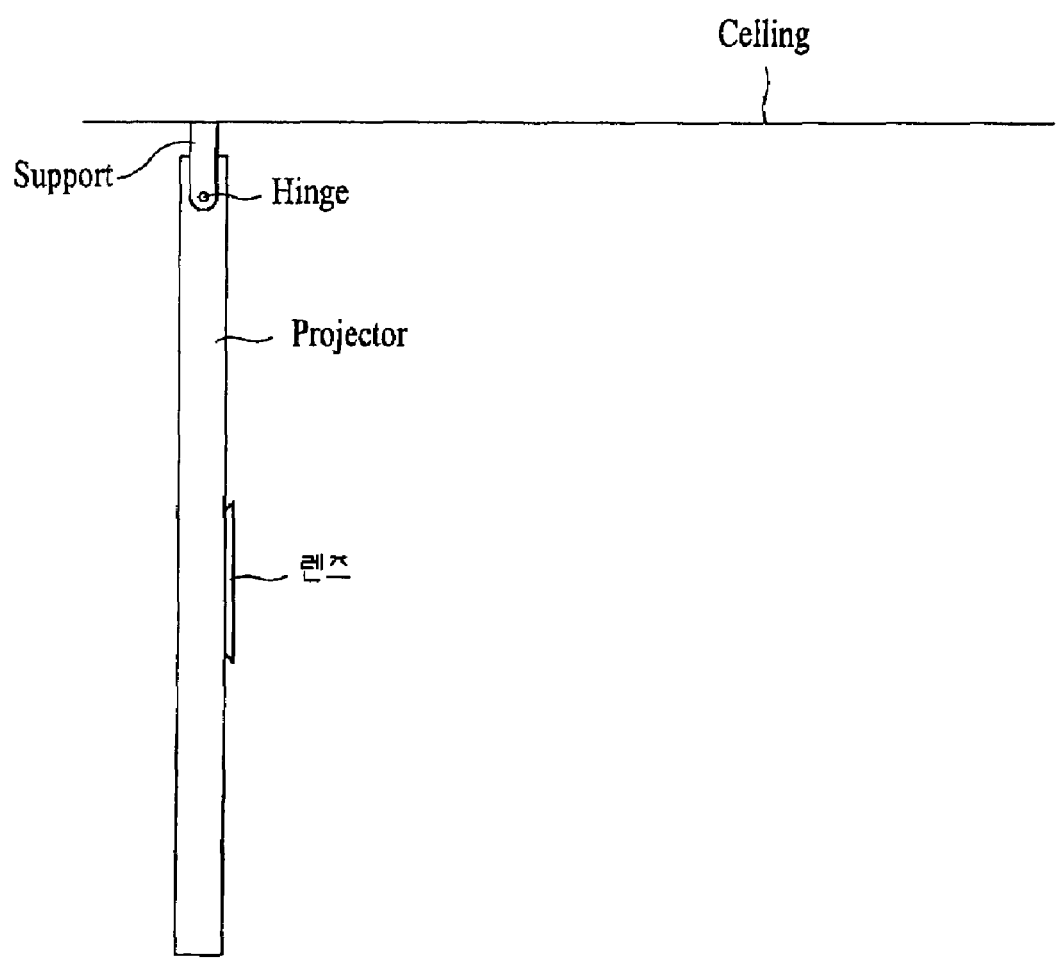

FIGS. 11A and 11B are side views illustrating a ceiling-mounted thin projector according to an embodiment of the present invention. FIG. 11A shows a folded state of the projector in which the projector cannot operate, whereas FIG. 11B shows an unfolded state of the projector in which the projector can operate.

As shown in FIGS. 11A and 11B, the projector of the present invention may be attached to a ceiling through a fixing means mounted to the top side of the projector.

In this case, the fixing means may include a support and a hinge, so as to allow the projector to be hingable.

Figure 12A:
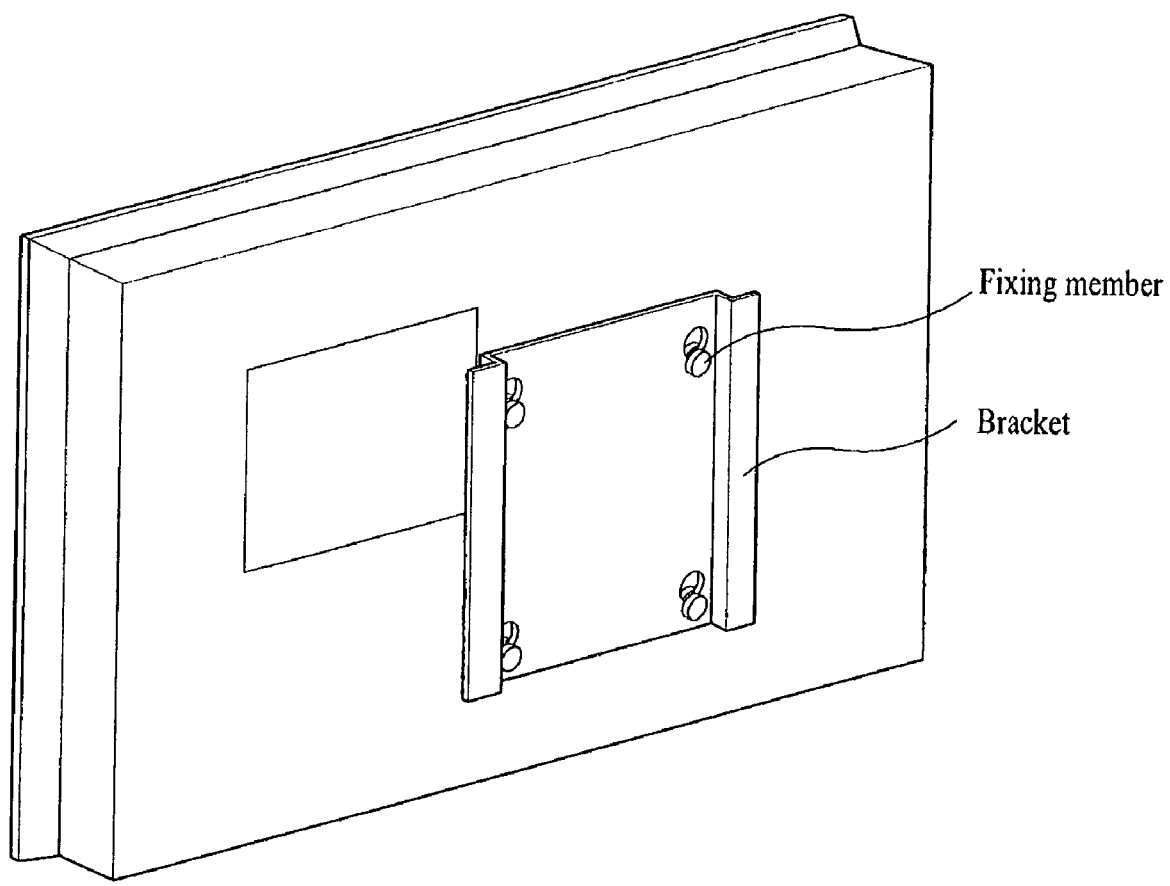
FIGS. 12A and 12B are rear views illustrating a ceiling-mounted thin projector according to another embodiment of the present invention.
Figure 12B:
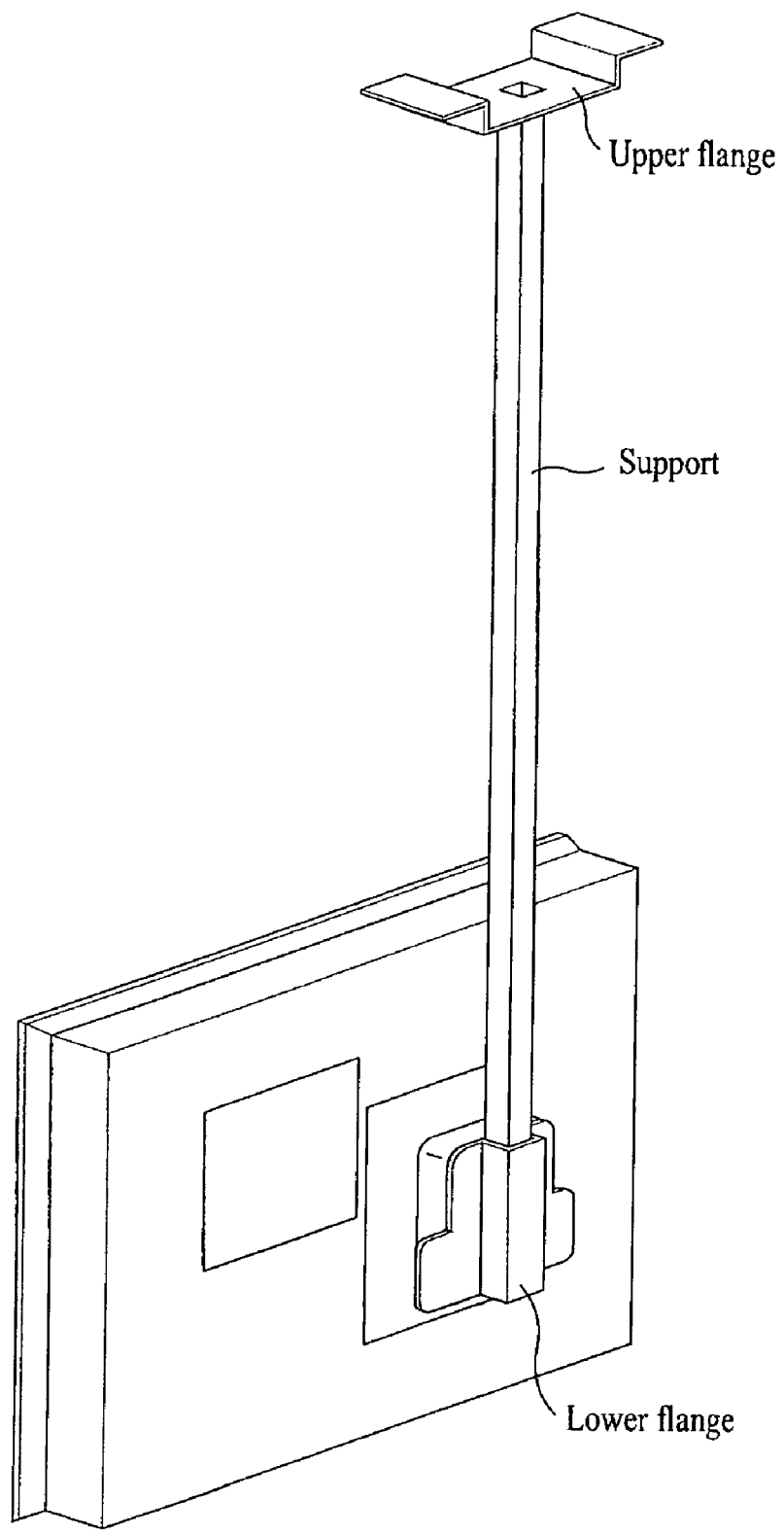

FIGS. 12A and 12B are rear views illustrating a ceiling-mounted thin projector according to another embodiment of the present invention.

As shown in FIGS. 12A and 12B, a support means is mounted to the rear side of the projector in order to mount the projector to a ceiling.

The support means includes a bracket fixed to the rear side of the projector, a low flange connected to the bracket, a support connected to the lower flange, and an upper flange connected to the support, and fixed to a ceiling.

The projector of the present invention may be configured to be installed on a floor in an upright state.

Figure 13A:
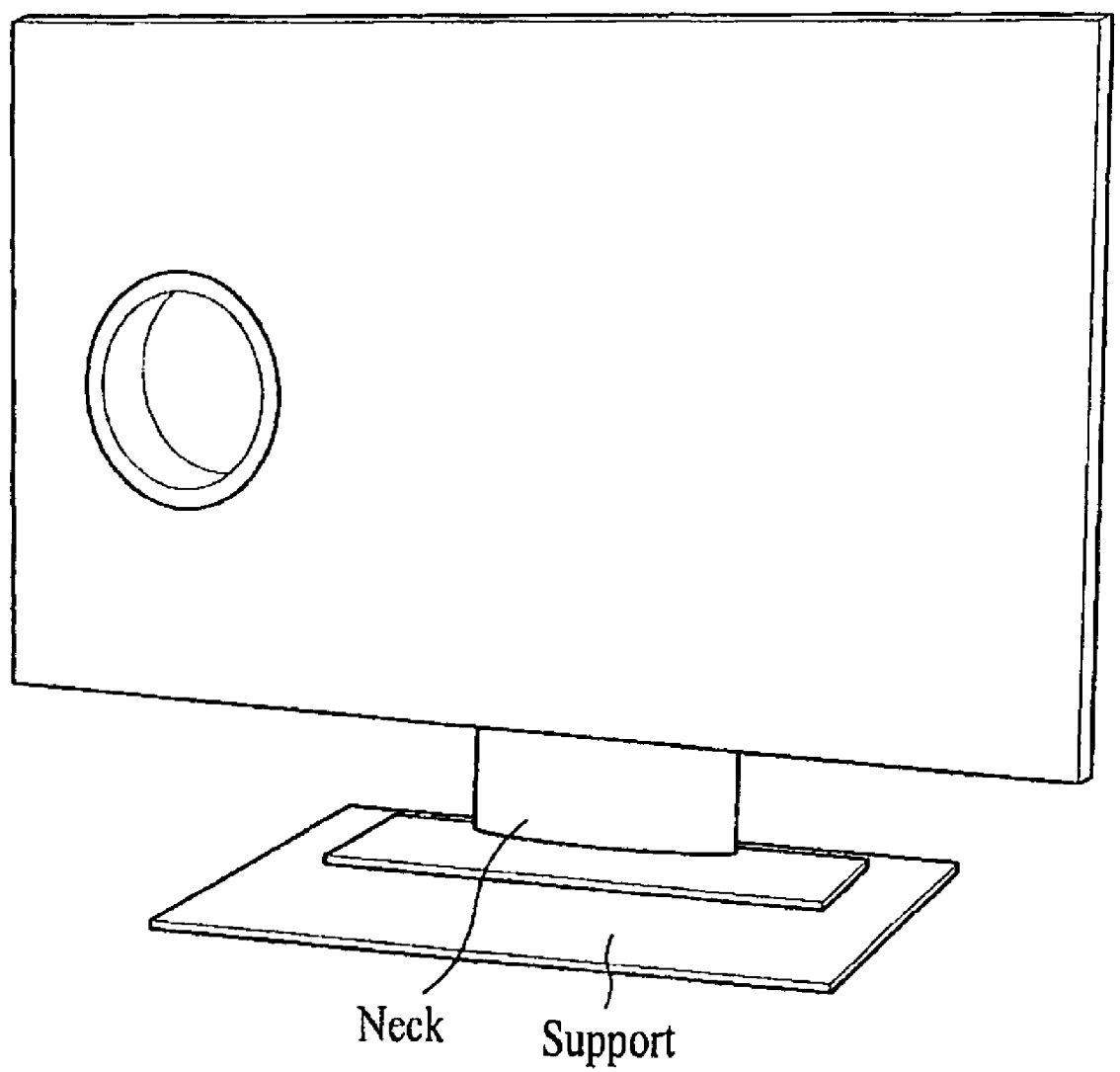
FIG. 13A is a front view illustrating a stand type projector according to an embodiment of the present invention.
Figure 13B:
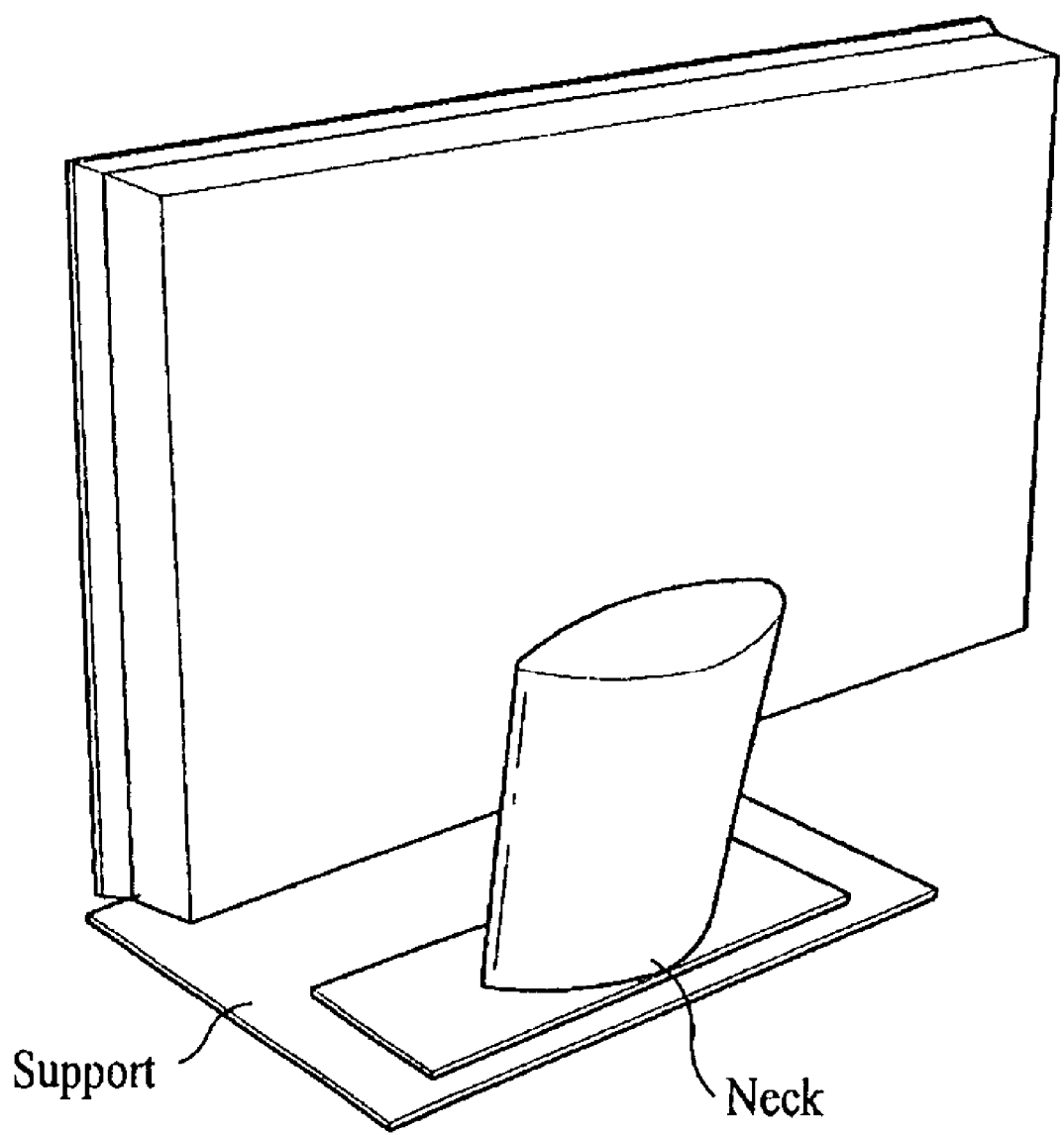
FIG. 13B is a rear view corresponding to FIG. 13A.

FIG. 13A is a front view illustrating a stand type projector according to an embodiment of the present invention. FIG. 13B is a rear view corresponding to FIG. 13A.

As shown in FIGS. 13A and 13B, the projector of the present invention can be stood on a floor in an upright state by a support means.

In this case, the support means may include a support and a neck. The neck is fixedly mounted to the rear side of the projector.

Meanwhile, the thin projector according to the present invention may be manufactured to have diverse shapes.

For example, the thin projector of the present invention may have an oval, circular, triangular, or polygonal shape having a small thickness.

As apparent from the above description, the present invention provides a thin projector which includes an optical system having an arrangement capable of reducing the thickness of the projector, so that the projector can be conveniently installed in a minimal installation space.

In accordance with the present invention, the thin projector includes a shiftable projection lens. Accordingly, it is possible to conveniently adjust the emission direction of light.

In accordance with the present invention, a sensor is used to prevent the projector from operating when the projector is incorrectly or unstably installed. Accordingly, it is possible to eliminate dangers such as fire.

Since thinness of a projector can be achieved in accordance with the present invention, it is possible to conveniently install the projector in diverse places.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projection lens unit, comprising:
   a plurality of lens sets for emitting light carrying an image; and
   a reflector arranged between adjacent ones of the lens sets or at a downstream end of the lens sets, and adapted to change a direction of light incident on the reflector,
   wherein the plurality of lens sets comprise
   a first lens set including at least one focus adjusting lens,
   a second lens set, separate from the first lens set, and including at least one zoom lens,
   a third lens set including at least one compensation lens, and
   a fourth lens set including at least one master lens, and
   wherein the first lens set, the second lens set, and the third lens set are arranged in parallel to a central axis of the light reflected from the reflector in an aligned manner and perpendicularly to a central axis of the light emitted from the fourth lens set.

2. The projection lens unit according to claim 1, wherein the first lens set is shiftable in parallel to a central axis of light incident on the first lens set, to adjust a focus of the image.

3. The projection lens unit according to claim 1, wherein the second lens set is shiftable in parallel to a central axis of light incident on the second lens set, to adjust a focal length of the image.

4. The projection lens unit according to claim 1, wherein the reflector includes a fully-reflective mirror or a prism.

5. A projection lens unit, comprising:
a master lens set adapted to emit light carrying a produced image;
a reflector arranged downstream from the master lens set, and adapted to change a direction of the light emitted from the master lens set;
a compensation lens set adapted to compensate light reflected from the reflector;
a zoom lens set adapted to adjust a focal length of light emitted from the compensation lens set; and
a focus adjusting lens set, separate from the zoom lens set, adapted to adjust a focus of light emitted from the zoom lens set, and to externally emit the focus-adjusted light,
wherein the compensation lens set, the zoom lens set, and the focus adjusting lens set are arranged in parallel to a central axis of the light reflected from the reflector in an aligned manner and perpendicularly to a central axis of the light emitted from the master lens set.

6. A thin projector comprising:
a housing having a panel shape including a front side, a rear side, a top side, and opposite lateral sides;
an illumination unit arranged in the interior of the housing, the illumination unit generating light and emitting the generated light;
a micro device arranged in the interior of the housing, the micro device receiving the light from the illumination unit and producing an image using the received light;
a projection lens unit arranged in the interior of the housing, the projection lens unit including a plurality of lens sets for emitting the image produced by the micro device, and a reflector arranged between adjacent ones of the lens sets or at a downstream end of the lens sets, and adapted to change a direction of light incident on the reflector, one of the lens units and reflector being arranged to be externally exposed through the front side of the housing;
a connector adapted to fix the housing such that the housing is arranged in an upright state;
air inlets formed at the lateral side of the housing where the projection lens unit is arranged and at the bottom side of the housing where the circuit is arranged; and
an air outlet formed at the top side of the housing where the illumination unit is arranged,
wherein the plurality of lens sets comprise
a first lens set including at least one focus adjusting lens,
a second lens set, separate from the first lens set, and including at least one zoom lens,
a third lens set including at least one compensation lens, and
a fourth lens set including at least one master lens.

7. The thin projector according to claim 6, wherein the housing is attached to a wall or a ceiling by the connector.

8. The thin projector according to claim 6, wherein each lateral side of the housing has an area smaller than an area of the front or rear side of the housing.

9. The thin projector according to claim 6, wherein the top or bottom side of the housing has an area smaller than an area of the front or rear side of the housing.

10. The thin projector according to claim 6, wherein the first lens set is shiftable in parallel to a central axis of light incident on the first lens set, to adjust a focus of the image.

11. The thin projector according to claim 6, wherein the second lens set may be shiftable in parallel to a central axis of light incident on the second lens set, to adjust a focal length of the image.

12. The thin projector according to claim 6, wherein the reflector includes a fully-reflective mirror or a prism.

13. The thin projector according to claim 6, wherein the projection lens unit is arranged perpendicularly to an image display face of the micro device.

14. The thin projector according to claim 6, wherein the projection lens unit is shiftable in a vertical direction of the front side of the housing, to adjust a position of the image projected onto a screen.

15. The thin projector according to claim 6, wherein the micro device is a liquid crystal display (LCD) panel, a liquid crystal on silicon (LCOS) panel, or a digital micromirror device (DMD) panel.

16. The thin projector according to claim 6, wherein the illumination unit includes:
a light source adapted to generate light;
a first illumination lens set adapted to provide a uniform brightness of the light generated from the light source;
a second illumination lens set adapted to converge light emitted from the first illumination lens set; and
a prism adapted to cause light emitted from the second illumination lens set to be incident on the micro device, and to cause light emitted from the micro device to be incident on the projection lens unit.

17. The thin projector according to claim 16, wherein the illumination unit further includes:
a color wheel arranged between the light source and the first illumination lens set, and adapted to separate the light generated from the light source into color light components; and
a mirror or prism arranged between the first illumination lens set and the second illumination lens set, and adapted to reflect light emitted from the first illumination lens set to the second illumination lens set.

18. The thin projector according to claim 16, wherein:
the first illumination lens set includes a light tunnel adapted to provide a uniform brightness of light, and at least one condensing lens; and
the second illumination lens set includes at least one condensing lens adapted to converge light.

19. The thin projector according to claim 6, wherein:
the projection lens unit is arranged at one lateral side of the housing; and
the illumination unit is arranged at the top side of the housing,
further comprising:
a circuit arranged at the bottom side of the housing, and adapted to drive the projection lens unit, the illumination unit, and the micro device.

* * * * *